(12) United States Patent
Schwarz

(10) Patent No.: US 9,199,316 B2
(45) Date of Patent: Dec. 1, 2015

(54) ROCK DRILLING TOOL FOR ROTATIONAL PERCUSSIVE MACHINING OF CONCRETE, ROCK, MASONRY AND SUCH MATERIALS

(75) Inventor: Gerhard Schwarz, Fronreute (DE)

(73) Assignee: Robert Bosch GmbH, Stuttgart (DE)

( * ) Notice: Subject to any disclaimer, the term of this patent is extended or adjusted under 35 U.S.C. 154(b) by 530 days.

(21) Appl. No.: 13/519,794

(22) PCT Filed: Nov. 23, 2010

(86) PCT No.: PCT/EP2010/067980
§ 371 (c)(1),
(2), (4) Date: Oct. 8, 2012

(87) PCT Pub. No.: WO2011/080009
PCT Pub. Date: Jul. 7, 2011

(65) Prior Publication Data
US 2013/0115020 A1    May 9, 2013

(30) Foreign Application Priority Data

Dec. 30, 2009 (DE) .......................... 10 2009 060 856
Apr. 21, 2010 (DE) .......................... 10 2010 017 987
Sep. 23, 2010 (DE) .......................... 10 2010 041 238

(51) Int. Cl.
*E21B 10/58* (2006.01)
*B23B 51/02* (2006.01)
(Continued)

(52) U.S. Cl.
CPC ............. *B23B 51/02* (2013.01); *B28D 1/146* (2013.01); *E21B 10/445* (2013.01); *E21B 10/58* (2013.01); *B23B 2226/75* (2013.01); *B23B 2251/18* (2013.01); *Y10T 408/9097* (2015.01)

(58) Field of Classification Search
CPC ....... E21B 10/44; E21B 10/485; E21B 10/54; E21B 10/445; E21B 10/58; B23B 51/02; B23B 2226/75; B23B 2251/18; B28D 1/146; Y10T 408/9097
USPC .................................. 175/323, 294, 395, 415
See application file for complete search history.

(56) References Cited

U.S. PATENT DOCUMENTS 7,001,120 B2    2/2006  Moser et al.
7,497,282 B2 *  3/2009  Batliner et al. ................ 175/415
(Continued)

FOREIGN PATENT DOCUMENTS

CN        1107201 A       8/1995
DE      102 08 630 A1     4/2003
(Continued)

OTHER PUBLICATIONS

International Search Report corresponding to PCT Application No. PCT/EP2010/067980, mailed Mar. 1, 2011 (German and English language document) (7 pages).

*Primary Examiner* — Brad Harcourt
(74) *Attorney, Agent, or Firm* — Maginot, Moore & Beck LLP

(57) ABSTRACT

A rock drilling tool includes a drilling head provided with a cutting body and a helix arranged between the drilling head and a shaft. The cutting body extends continuously over a nominal diameter of the rock drilling tool and has an inner region configured as a centering tip and an outer region bordering the centering tip in the radial direction. The outer region is offset towards the rear in relation to the centering tip in the active direction of the rock drilling tool. The centering tip is configured as a pyramid or a truncated pyramid and has pyramidal edges with lateral surfaces located therebetween. At least one lateral surface of the centering tip is configured as a cavity.

19 Claims, 29 Drawing Sheets

(51) Int. Cl.
 *B28D 1/14* (2006.01)
 *E21B 10/44* (2006.01)

(56) References Cited

U.S. PATENT DOCUMENTS 7,861,807 B2 * 1/2011 Probst et al. .................. 175/420

2005/0274551 A1 * 12/2005 Batliner et al. ............... 175/414

FOREIGN PATENT DOCUMENTS

| DE | 10 2006 020 538 A1 | 11/2007 |
| EP | 1 604 762 A1 | 12/2005 |
| EP | 1 865 144 A1 | 12/2007 |
| EP | 1 923 159 A1 | 5/2008 |

* cited by examiner

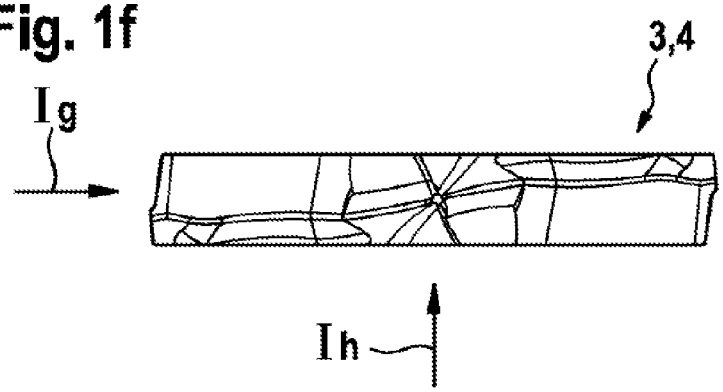
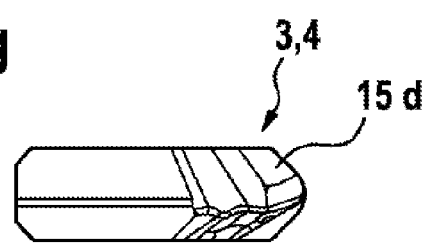
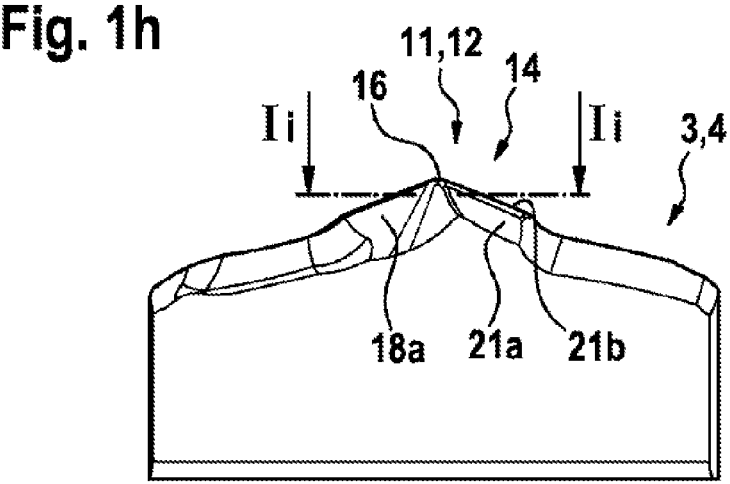

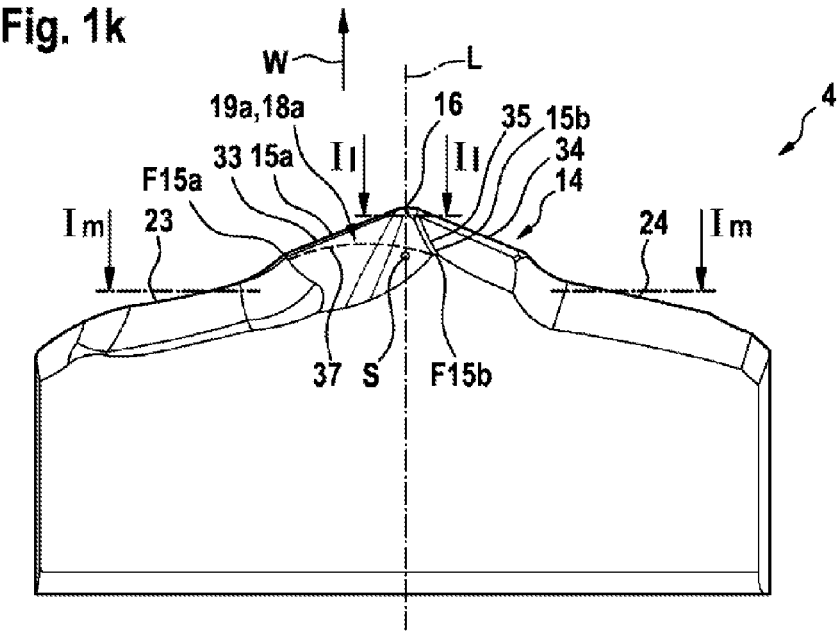
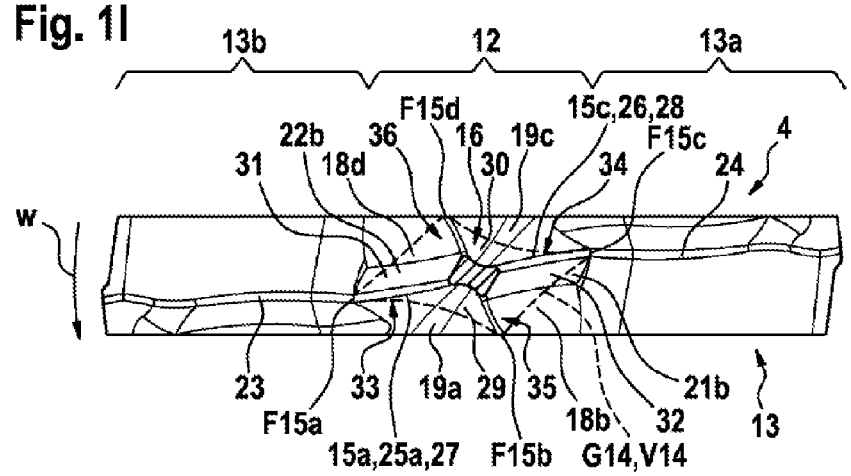

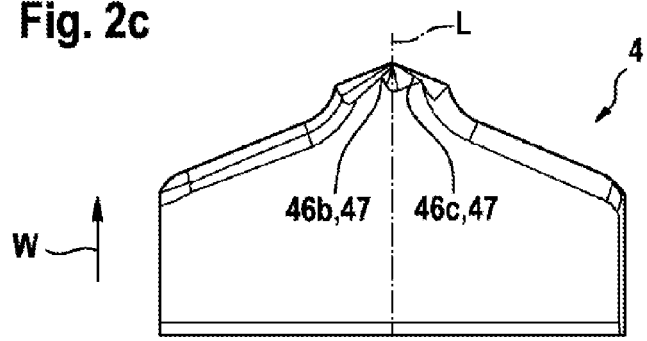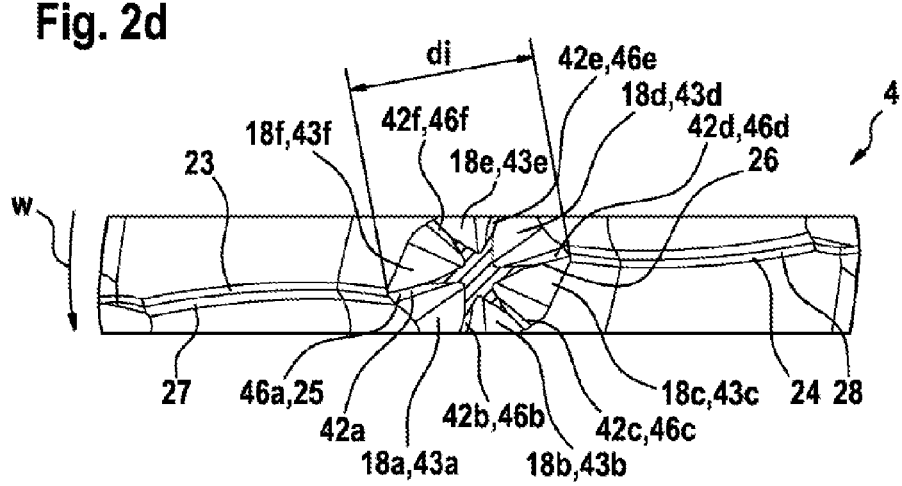

14

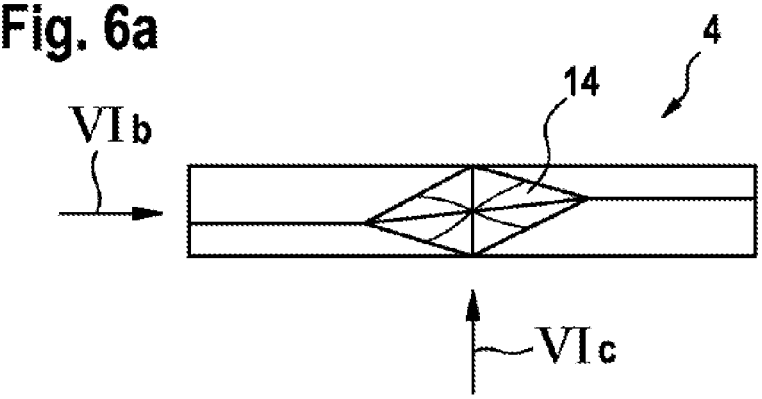
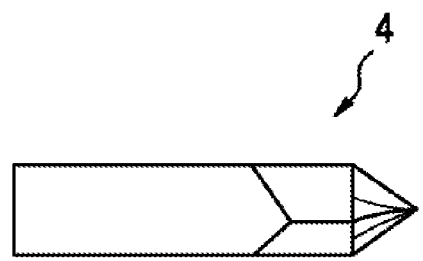
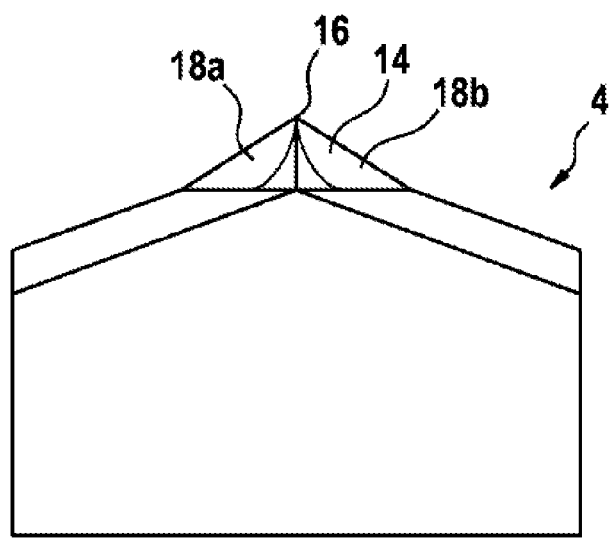

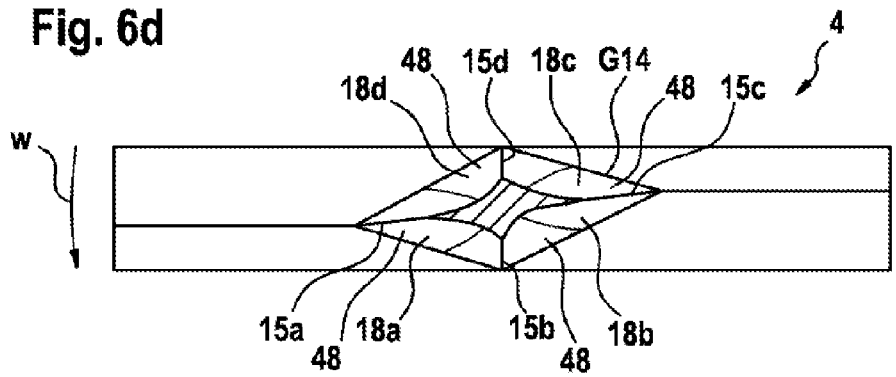
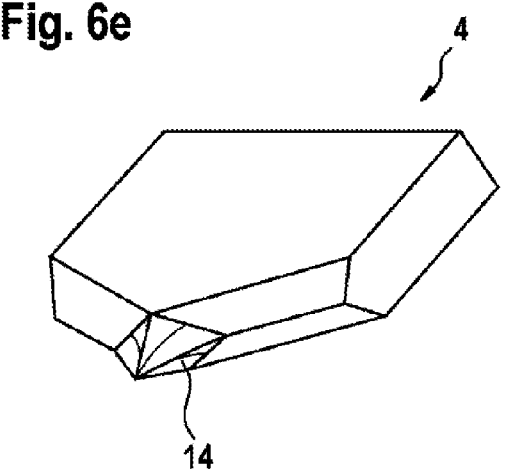
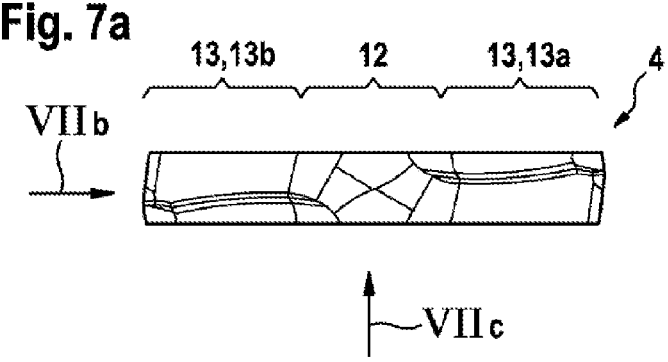

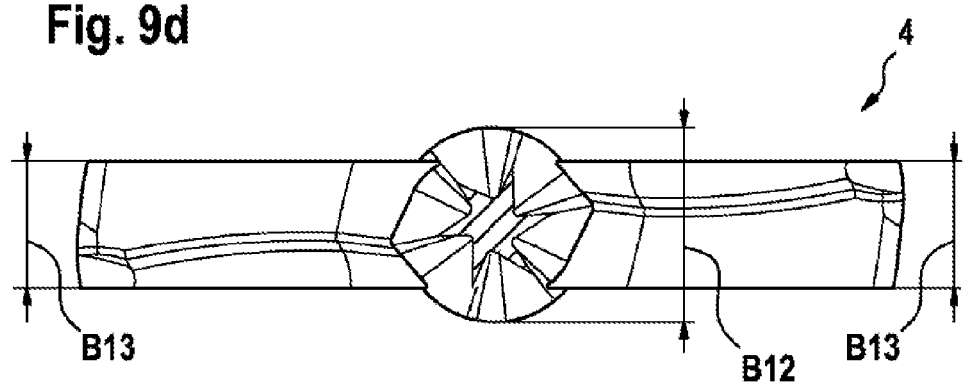
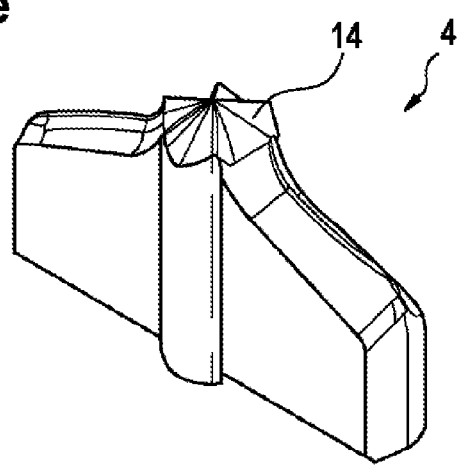
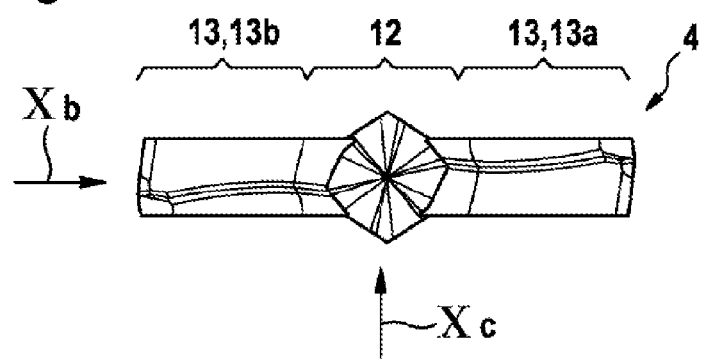

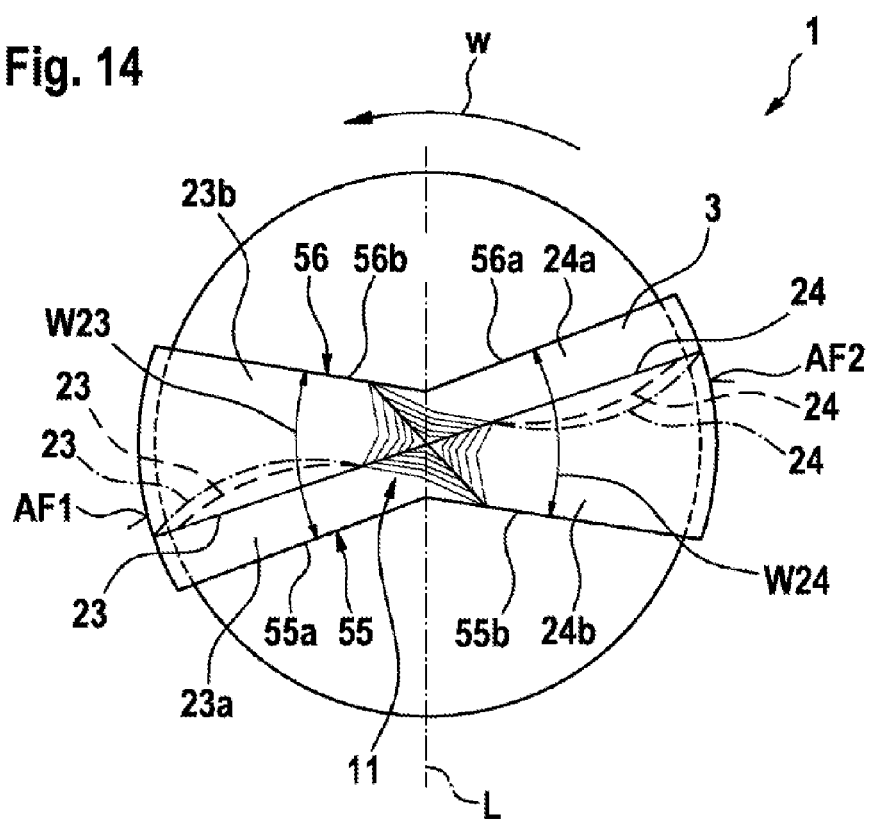

ROCK DRILLING TOOL FOR ROTATIONAL PERCUSSIVE MACHINING OF CONCRETE, ROCK, MASONRY AND SUCH MATERIALS

This application is a 35 U.S.C. §371 National Stage Application of PCT/EP2010/067980, filed on Nov. 23, 2010, which claims the benefit of priority to Serial Nos. DE 10 2009 060 856.7, filed on Dec. 30, 2009; DE 10 2010 017 987.6, filed on Apr. 21, 2010; and DE 10 2010 041 238.4, filed on Sep. 23, 2010 in Germany, the disclosures of which are incorporated herein by reference in their entirety.

BACKGROUND

The disclosure relates to a rock drilling tool for the rotational percussive machining of concrete, rock, masonry and such materials.

DE 102 08 630 A1 makes known a rock drilling tool for rotational percussive machining of concrete, rock, masonry and such materials, the rock drilling tool including a drill head which includes a cutting body, and a helix arranged between the drill head and a shaft, wherein the cutting body extends in an uninterrupted manner over a nominal diameter of the rock drilling tool, wherein the cutting body includes an inner region realized as a centering tip and an outer region adjoining the centering tip in the radial direction, wherein the outer region is set back in the effective direction of the rock drilling tool in relation to the centering tip, wherein the centering tip is realized as a pyramid or as a truncated pyramid and has pyramidal edges, wherein side surfaces lie between the pyramidal edges and wherein a tip of the pyramid or of the truncated pyramid is passed through by a longitudinal center axis of the drilling tool.

The object underlying the disclosure is to create a rock drilling tool, the material removal rate of which is increased in the region of its centering tip.

This object is achieved through the characteristic features of the disclosure. Advantageous and expedient further developments are provided in the sub-claims.

SUMMARY

The disclosure relates to a rock drilling tool for rotational percussive machining of concrete, rock, masonry and such materials, where at least one side surface of the centering tip, which is realized as a pyramid or a truncated pyramid, is formed as a cavity. This means that in the region of a pyramidal edge adjoining the cavity, the centering tip obtains more aggressive drilling and percussion power as the pyramidal edge recedes into the cavity more deeply in opposition to the effective direction of the rock drilling tool than is the case with a comparable centering tip with planar side surfaces. The core of the disclosure, consequently, is an increase in aggressiveness or in penetration of a rock drilling tool for rotational percussive operation, which—retaining a proven basic geometry—is obtained by the targeted conversion of at least one selected planar surface of the basic geometry into a cavity. By designing at least one side surface of the centering tip, realized as a pyramid or a truncated pyramid, as a cavity, it is possible to achieve a smaller negative rake angle or a smaller wedge angle in the region of a pyramidal edge and thus to increase the efficiency of the rock drilling tool at the centering tip with regard to percussive destruction and with regard to the stripping action. Consequently, the core of the disclosure is a rock drilling tool which is developed on the basis of proven rock drilling tools by means of targeted material removal in the region of the centering tip.

As claimed in the disclosure, it is provided that at least two adjacent side surfaces of the centering tip are realized in each case as a cavity. This means that in the region of the pyramidal edge at which the two cavities merge into each other, compared to a rock drilling tool with planar surfaces between the pyramidal edges, there is a main or secondary cutting edge, the negative rake angle of which is made smaller and the clearance angle of which is made larger, such that the main or secondary cutting edge—when viewed in section—has a reduced wedge angle and as a result has an increased action in percussion and in rotation.

As an alternative to this, the disclosure provides that all the side surfaces of the centering tip are realized in each case as a cavity. This means that the advantages mentioned in the preceding paragraph are produced at all the main and secondary cutting edges.

The disclosure also provides that a wedge is formed in the region of the pyramidal edge of the centering tip lying between two cavities, the wedge surfaces of which wedge being formed by surface portions of the adjacent cavities, wherein a wedge angle of the wedge is smaller than a wedge angle of a centering tip with planar side surfaces. These types of wedges form, in each case, main or secondary cutting edges of the centering tip and serve for increased material removal.

In addition, the disclosure provides that a cavity lying in front of the pyramidal edge in the direction of rotation of the rock drilling tool is realized as a face cavity and a cavity lying behind the pyramidal edge in the direction of rotation of the rock drilling tool is realized as a flank cavity, wherein the face cavity ascends more steeply toward the pyramidal edge than the flank cavity. This means that a wedge or a main or secondary cutting edge is obtained where the amount of negative rake angle is less than half the wedge angle and is consequently aggressive and sturdy.

The disclosure also provides that the base of the pyramid is realized in particular as a polygon with an odd number of corners or in particular as a polygon with an even number of corners. Polygons with an even number of corners are suitable, in particular, as bases for centering tips with four or six pyramidal edges which are symmetrical with respect to a plane which is passed through by the longitudinal center axis of the rock drilling tool. Polygons with an odd number of corners are suitable, in particular, for centering tips with five, seven or more pyramidal edges where the orientation of the pyramidal edges is not dependent on an orientation of the outer cutting edges.

The disclosure also provides that at least one of the cavities deepens in the direction of a center of gravity of the centering tip. This means that a rock drill with increased power is created with a cutting body for which less cemented carbide is necessary compared to a rock drill with a cutting body with planar surfaces.

In addition, the disclosure provides that at least two of the pyramidal edges are realized as inner cutting edges and are formed, in particular, as an uninterrupted continuation of the outer cutting edges of the cutting body. Positioning the inner cutting edges of the centering tip and the outer cutting edges of the outer region of the cutting body in this manner creates a cutting body which is optimized in particular also for cutting both in a transition region between the centering tip and the outer region of the cutting body and consequently has a good stripping performance and in particular runs smoothly also in the exclusively rotating mode, which is used sometimes when spot-drilling.

In addition, the disclosure provides for at least one of the pyramidal edges, between its root and the tip of the pyramid or of the truncated pyramid, to have a development where the pyramidal edge extends in particular in a curved and/or in particular in a buckled manner along at least one portion keeping the gradient constant with respect to the longitudinal axis. Such a development of the pyramidal edge at a constant angle with respect to the longitudinal axis of the rock drilling tool makes it possible, for example, to realize the pyramidal edge as an inner cutting edge which is curved in a crescent-shaped manner and, when viewed in top view onto the drill head or in the direction of the longitudinal axis of the rock drilling tool, approximates the tip of the pyramid or of the truncated pyramid along a curved path.

The disclosure additionally provides for at least one of the pyramidal edges between its root and the tip of the pyramid or of the truncated pyramid, to have a development where the pyramidal edge of the pyramid extends along at least one portion in particular with increasing gradient with respect to the longitudinal axis or in particular with reducing gradient with respect to the longitudinal axis or in particular with erratic change in the gradient with respect to the longitudinal axis. Such a development of the pyramidal edge with a reducing angle with respect to the longitudinal axis of the rock drilling tool or with an increasing angle with respect to the longitudinal axis of the rock drilling tool or with an erratically increasing or reducing angle with respect to the longitudinal axis of the rock drilling tool, makes it possible, for example, to realize a buckle-shaped, sturdy centering tip in the case of an increasing angle or an acute, very aggressive centering tip in the case of a reducing angle.

As claimed in the disclosure, an overlapping of the developments of the pyramidal edges described in the two preceding sections is also provided. In this case, it is provided in particular to realize at least two pyramidal edges realized in a mirror-symmetrical manner with respect to the longitudinal axis, in a curved manner and with reducing gradient with respect to the longitudinal axis. Developing the pyramidal edges in such a manner creates a sturdy tip which is realized as a percussive cone.

Finally, the disclosure also provides that the cavity is realized, in particular, by two planar surfaces or in particular by several planar surfaces. Using this type of simple geometry, the advantages as claimed in the disclosure can be achieved in a simple and cost-efficient manner.

As claimed in the disclosure, it is also provided that the cavity is realized in a buckle-free and curved manner between adjacent pyramidal edges. In the case of rock drilling tools realized in this manner, the cutting body can be cleaned simply after use as the cutting body is free of set back edges. The possibility of cleaning the cutting body of the rock drilling tool in a rapid and successful manner propels its user to care and monitor the rock drill. This means in the end that accidents are prevented and, in addition, ensures constant high quality of the bores as a result.

In addition, the disclosure provides that the outer cutting edges, which are formed outside the centering tip by the coinciding of a face and a flank, have a curved development, and, when viewed in the direction of the longitudinal axis, are curved in opposition to a direction of rotation of the drilling tool. The blade-shaped cutting edge achieves an improved entrainment of the drillings about the longitudinal axis or axis of rotation of the rock drilling tool. The improved entrainment leads to more drillings being supplied to the discharge grooves and consequently to a reduction in the amount of drillings which accumulate between the bore hole wall and the rock drilling tool and impair the drilling operation.

As claimed in the disclosure, a radially outwardly diverging development of part surfaces of the side surfaces is provided, the part surfaces defining in each case the first and the second outer cutting edge to the side. This means that the radially outwardly increasing cutting forces can be better absorbed by the cutting body.

The disclosure also provides that at least one contour line of the centering tip, which specifies a contour in the direction of the longitudinal axis, forms an octagon, where the inner angles enclosed between the consecutive side edges are, in an alternating manner, more than 180° and less than 180°. Such geometry leads to a tip which penetrates in an optimum manner into the rock or the concrete during percussion by its volume, which is reduced compared to a four-sided pyramid, and at the same time has a good cutting and stripping performance by means of its pyramidal edges which are enhanced in comparison with a four-sided pyramid.

Finally, the disclosure provides that a diameter of the centering tip is dimensioned in proportion to the nominal diameter of the drill and the diameter of the centering tip is realized in particular between ⅙ and ⅜ of the nominal diameter and preferably approximately ⅓ of the nominal diameter. A solid design of the centering tip in this manner leads to higher stability and nevertheless has a high removal performance due to the special development.

In terms of the disclosure, the term a cutting body includes both inserts which are embedded between continuations of the helix and form the drill head with the same, and also solid cemented carbide heads which are fastened in an obtuse manner on the helix and form the entire drill head. Centering tips which are inserted in a separate manner are not cutting bodies within the terms of the disclosure.

In the terms of the disclosure, a cavity is a concave surface which runs between two pyramidal edges of the centering tip, the centering tip being realized as a pyramid or a truncated pyramid.

BRIEF DESCRIPTION OF THE DRAWINGS

Further details of the disclosure are described in the drawing by way of the schematically represented exemplary embodiments, in which:

FIGS. 2a to 2k: show a cutting body realized as an insert for a second rock drilling tool as claimed in the disclosure;

FIGS. 3a to 10e: show eight further design variants of a cutting body realized as an insert or as a solid cemented carbide head for rock drilling tools as claimed in the disclosure;

DETAILED DESCRIPTION

Figure 1A:
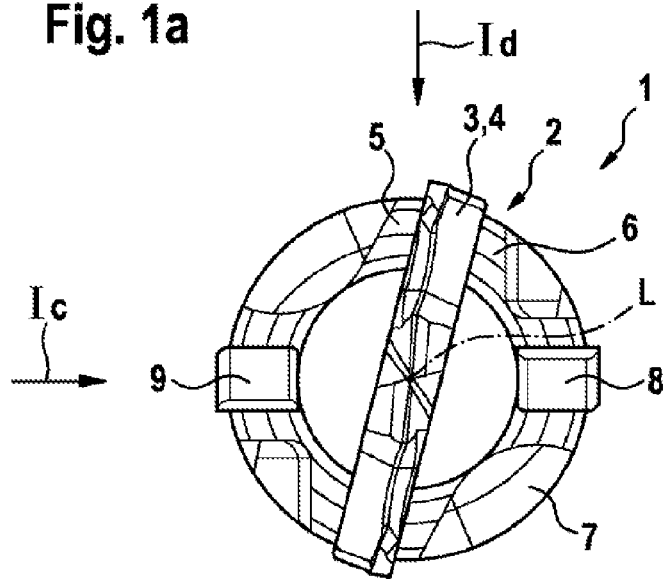
FIG. 1a to 1p: show different views and sections of a rock drilling tool as claimed in the disclosure and the cutting body thereof.

FIG. 1a shows a top view in the direction of a longitudinal axis L of a rock drilling tool 1 as claimed in the disclosure. A drill head 2 of the rock drilling tool 1 includes a cutting body 3, which is realized as an insert 4. The insert 4 is held between continuations 5, 6 of a helix 7. In addition, two pilot cutting bodies 8, 9 are embedded into the continuations 5, 6 which are components of the drill head 2.

Figure 1B:
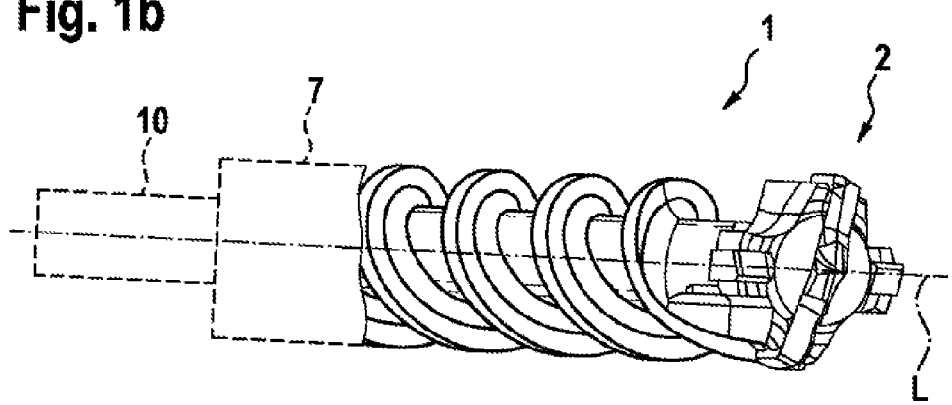

FIG. 1b shows a perspective view of the rock drilling tool 1 shown in FIG. 1a. The further development of the helix 7 and a shaft 10 connecting to the helix are shown by way of the broken lines.

Figure 1C:
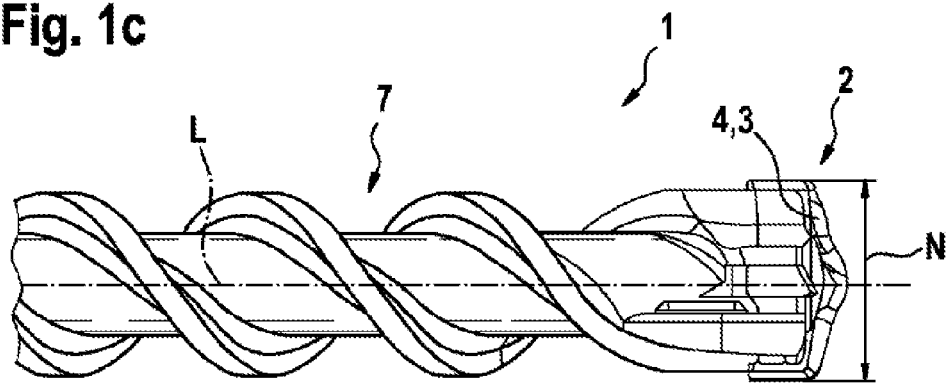

FIG. 1c shows a side view of the rock drilling tool 1 from the arrow direction 1c indicated in FIG. 1a. In this view it can be seen how the insert 4 extends over a nominal diameter N of the rock drilling tool 1 running transversely with respect to the longitudinal axis L.

Figure 1D:
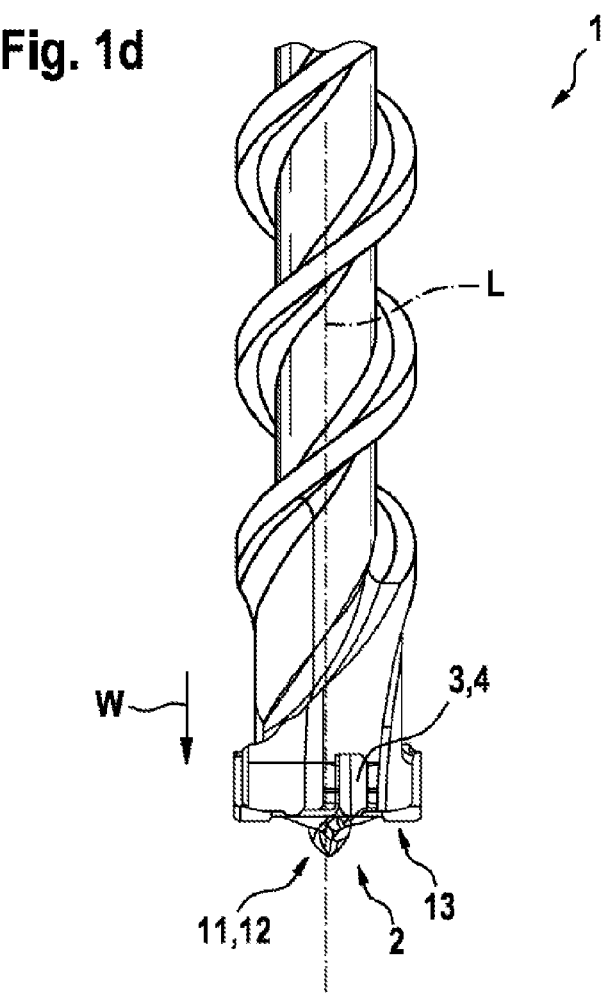
Figure 1E:
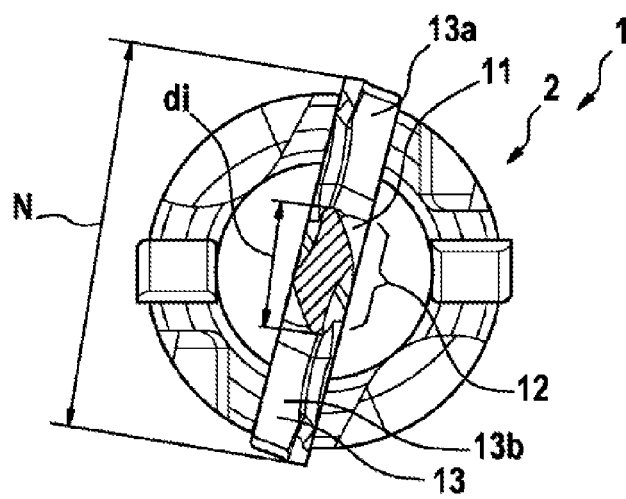

FIG. 1d shows a further side view of the rock drilling tool 1, as is produced when the representation of FIG. 1a is looked at from an arrow direction 1d. It can be seen in FIG. 1d how a centering tip 11, which is arranged in an inner region 12 of the cutting body 3 or of the insert 4, projects in an effective direction W of the rock drilling tool 1 beyond an outer region 13 of the cutting body 3 or of the insert 4. To understand this better, reference is made here to FIG. 1e which shows the rock drilling tool 1 corresponding to the representation of FIG. 1a, however the centering tip 11 is shown cut off. The inner region 12 extends over a diameter di which is a maximum of 40% of the nominal diameter N. The outer region 13 is assembled from two part regions 13a and 13b which abut against the inner region 12 in the direction of the development of the nominal diameter N.

Figure 1I:
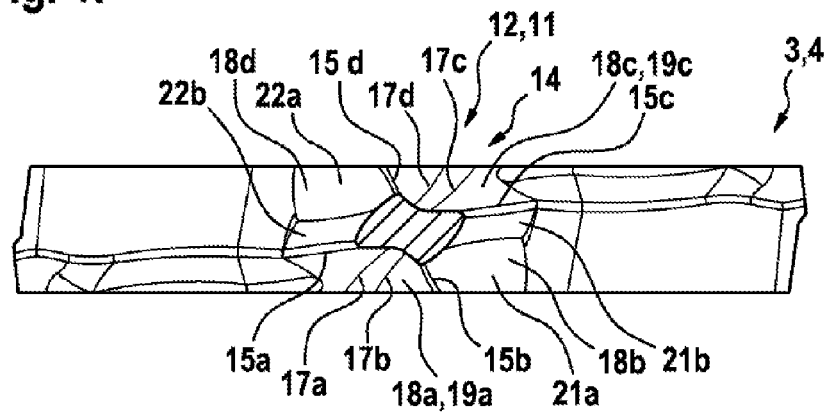
Figure 1J:
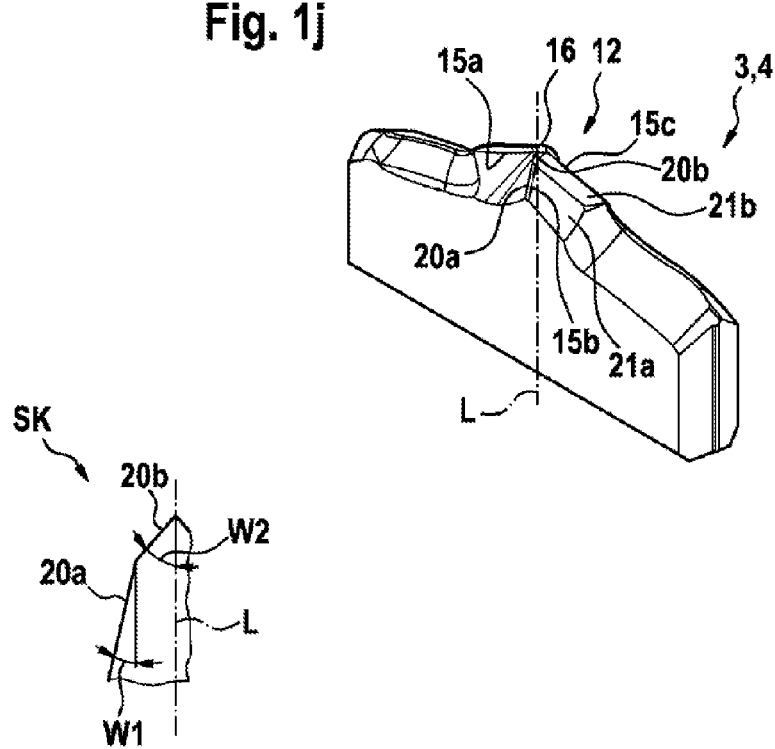

FIG. 1f now shows a top view of the cutting body 3 or the insert 4 on its own without the continuations, the pilot cutting bodies, the helix and the shaft. The representations 1g and 1h shows side views of the insert 4 from the arrow directions Ig and Ih indicated in FIG. 1f. FIG. 1i shows a section through the FIG. 1h corresponding to the line of intersection Ii-Ii. FIG. 1j shows a perspective view of the insert 4. It can be seen in particular from looking at FIGS. 1h, 1i and 1j together that the centering tip 11 forming the inner region 12 is realized as a pyramid 14 which has four pyramidal edges 15a to 15d which converge in a tip 16 of the pyramid 14. Between the pyramidal edges 15a and 15b or 15c and 15d it is possible to see subsidiary lines 17a to 17d which have a ray-like development with reference to the tip 16 of the pyramid 14. Said subsidiary lines 17a to 17d indicate in a simplified manner a concavely curved shape of side surfaces 18a and 18d, which lie between the pyramidal edges 15a and 15b or 15c and 15d. The side surfaces 18a, 18c are consequently realized as cavities 19a, 19c. As can be seen when looking at FIGS. 1h, 1i, 1j and 1g together, the pyramidal edges 15b and 15d have a buckled development. A first, lower portion 20a of the pyramidal edge 15b has a first angle W1 with respect to the longitudinal axis L. A second portion 20b of the pyramidal edge 15b has a second angle W2 with respect to the longitudinal axis L. The first angle W1 is smaller than the second angle W2. This is shown in a schematic diagram SK associated with FIG. 1j. Consequently the pyramidal edge 15b extends in its upper portion 20b in a flatter manner than in its lower portion 20a. The pyramidal edge 15d extends in a mirror-symmetrical manner with respect to the pyramidal edge 15b with reference to the longitudinal axis L and has a corresponding development. Said buckling-away development of the pyramidal edge 15b is caused by side surfaces 18b and 18d, which lie between the pyramidal edges 15d and 15c or 15d and 15a, being assembled in each case by two differently orientated part surfaces 21a, 21b or 22a, 22b.

The description is continued by way of FIGS. 1k and 1l, FIG. 1k being an enlarged representation of FIG. 1h, in which further cutting developments are shown and FIG. 1l showing a section through the FIG. 1k corresponding to the line of intersection IL-IL. As can be seen in FIG. 1l, outer cutting edges 23, 24 of the cutting body 4, which extend over part regions 13a, 13b of the outer region 13 in the direction of the inner region 12, are continued in an uninterrupted manner by means of the pyramidal edges 15a and 15c toward a tip 16 shown cut-off in FIG. 1l. In this case, the pyramidal edges 15a and 15c form inner cutting edges 25, 26, which have the function of main cutting edges 27, 28. The cavities 19a and 19c, which lie in front of the inner cutting edges 25, 26 in a direction of rotation w of the insert 4, form so-called face cavities 29, 30, through the form of which the inner cutting edges 25, 26 maintain a small negative rake angle which is between 10° and 45° and preferably is approximately 30°. Flanks 31, 32 of the inner cutting edges 25, 26 are formed by the part surfaces 21b and 22b of the side surfaces 18b and 18d. Consequently, wedges 33, 34 are formed in the region of the pyramidal edges 15a and 15c, the wedge 33 being formed by the cavity 19a and the part surface 22b, which coincide in the pyramidal edge 15a and the wedge 34 being formed by the cavity 19c and the part surface 21b, which coincide in the pyramidal edge 15c. Corresponding to the above-described development of the cavities 19a and 19c, the wedges 33 and 34 have wedge angles which are reduced by at least 30% compared to wedge angles of a pyramid where the side surfaces are realized as planar surfaces. In the region of the pyramidal edges 15b and 15d, further wedges 35 and 36 are formed, the form of which is determined by the cavity 19a and the lateral surface 18b or by the cavity 19c and the side surface 18d, which coincide at the pyramidal edges 15b and 15d. Said wedges 35, 36 which—as can be seen in FIG. 1k—are set back in relation to the wedges 33 and 34 in opposition to the effective direction W, have their destructive action in particular during the percussive movement of the rock drilling tool. It can also be seen in FIG. 1k how the cavity 19a is curved in a concave manner in the direction of a point of gravity S of the pyramid 14. A broken line shows a base side 37 of the pyramid 14 which extends from a root F15a of the pyramidal edge 15a to a root 15b of the pyramidal edge 15b. The development of the base side 37 is curved as a result of the cavity-like design of the side surface 18a. In a corresponding manner, a base surface G14 of the pyramid 14—as is shown in a schematic manner by the broken lines in FIG. 1l—is realized as rectangle V14 between the roots F15a, F15b, F15c and F15d of the pyramidal edges 15a to 15d, the base sides 37 to 40 extending in a curved manner corresponding to the curvature of the side surfaces 18a to 18d.

Figure 1M:
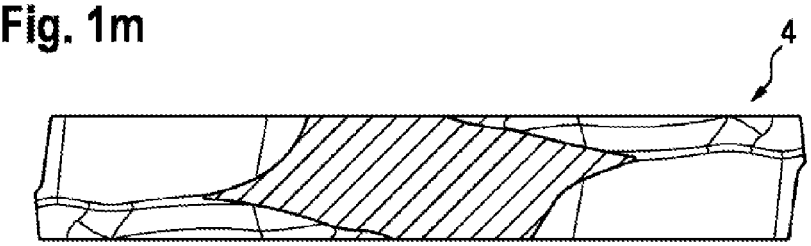

FIG. 1m shows the insert 4 corresponding to the cutting development 1m-1m shown in FIG. 1k. The line of cut 1m-1m extends below the centering tip 14.

Figure 1N:
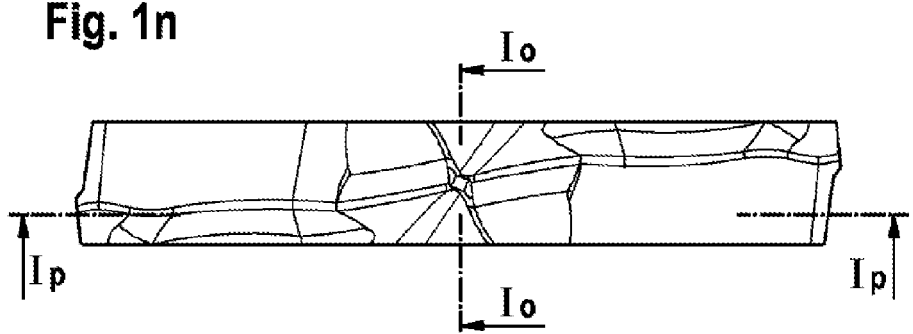
Figure 1O:
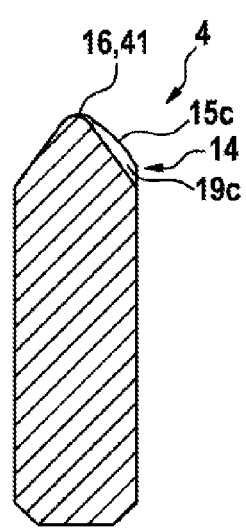
Figure 1P:
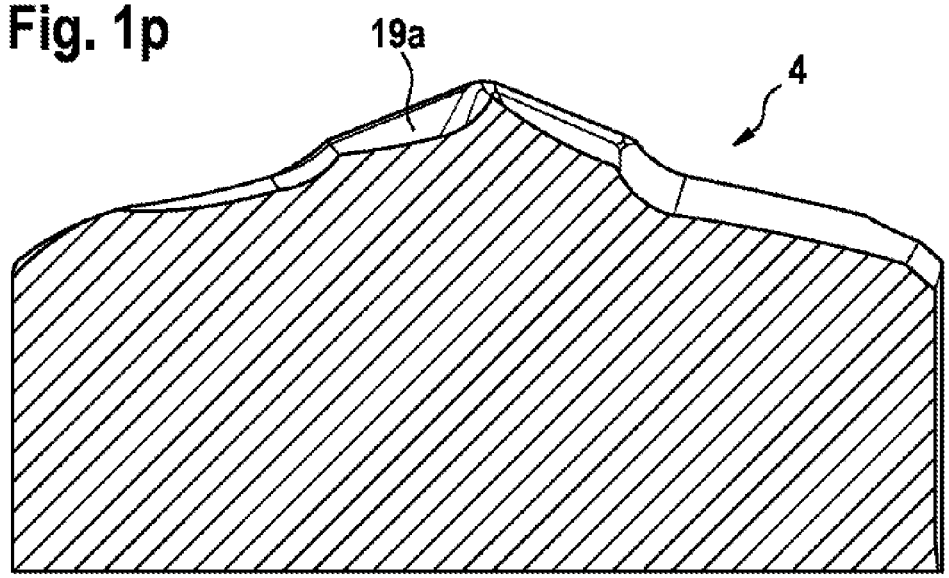

FIG. 1n shows an enlarged representation of FIG. 1f, in which the cutting developments Io-Io and Ip-Ip of the representations of the insert 4 shown in FIGS. 1o and 1p are indicated.

FIG. 1o shows the cavity 19c which ascends toward the pyramidal edge 15c. In addition, the section shows that the tip 16 of the pyramid 14 is realized as a cone 41 in order to be able to withstand better the percussive loads.

The sectional representation 1p once again shows the curved form of the cavity 19a.

FIGS. 2a to 2k show a further cutting body 3 which is realized as insert 4 for a second rock drilling tool as claimed in the disclosure. The insert 4 is divided into an inner region 12 and an outer region 13, the inner region 12 being defined by a centering tip 11, to which the outer region 13 connects by way of its part regions 13a and 13b. The insert 4 extends over a nominal diameter N, a diameter di of the inner region 12 is a maximum of 40% of the nominal diameter N.

Figure 2A:
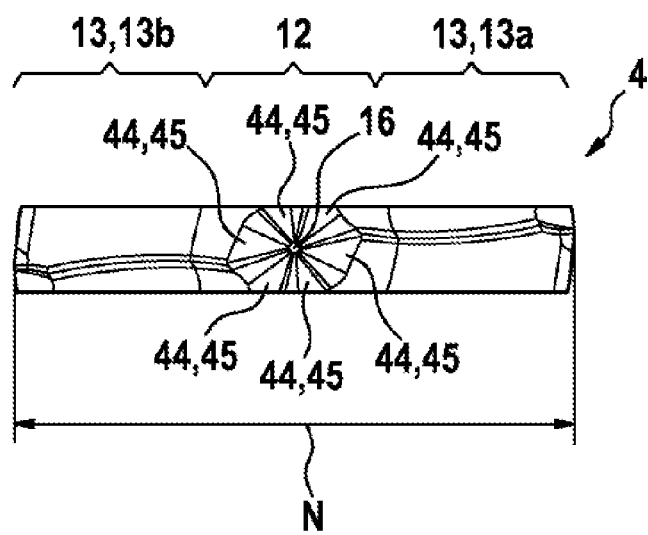
Figure 2B:
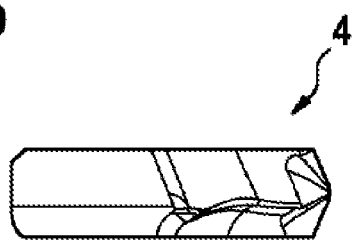
Figure 2E:
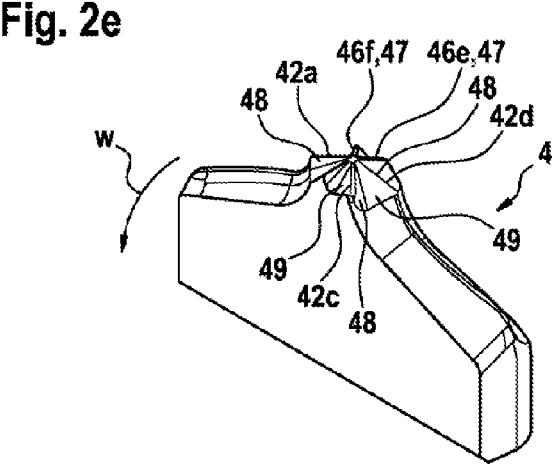

FIG. 2a shows a top view onto the insert 4. FIGS. 2b and 2c show side views of the insert 4 from the arrow directions IIb and IIc indicated in FIG. 2a. FIG. 2d shows a top view onto the insert 4 with a centering tip 11 shown in a sectioned manner. FIG. 2e shows a perspective view of the insert 4.

As can be seen in particular from FIG. 2d, the centering tip 11 is realized as a pyramid 14, which has six pyramidal edges 42a to 42f, which extend from roots F42a to F42f to a tip 16—see FIG. 2a—of the pyramid 14. All the side surfaces 18a to 18f between the pyramidal edges are realized as cavities 43a to 43f. A concave curvature of all the cavities 43a to 43f toward a longitudinal center axis L of the insert 4 or of the rock drilling tool can be seen from the cutting edges visible in FIG. 2d. When viewed in the direction of rotation w, each cavity 43a to 43f forms a face cavity 44 for the following pyramidal edge and a flank cavity 45 for the preceding pyramidal edge. In the region of the pyramidal edges 18a to 18f, the pyramid 14 consequently has six wedges 46a to 46f, which are each formed by surface portions of the cavities 43a to 43f which coincide in the respective pyramidal edge 18a to 18f. As inner cutting edges 25, 26, the wedges 46a and 46d form a seamless continuation of the outer cutting edges 23 and 24. Two main cutting edges 27 and 28, which extend over the insert 4, are consequently formed by the outer cutting edges 23 and 24 as well as the inner cutting edges 25 and 26. The centering tip 11 or the pyramid 14 projects beyond the outer region 13 of the insert 14 in the effective direction W. It can be seen in particular from FIGS. 2c and 2f how the wedges 46b, 46c, 46e and 46f form centrally arranged secondary cutting edges 47. Through the development of the side surfaces 18a to 18f, in the direction of rotation w of the insert 4 a face 48 is formed in front of each pyramidal edge 42a to 42f and a flank 49 is formed behind each pyramidal edge 42a to 42f. FIG. 2e shows some faces 48 and some of the flanks 49 by way of example.

Figure 2F:
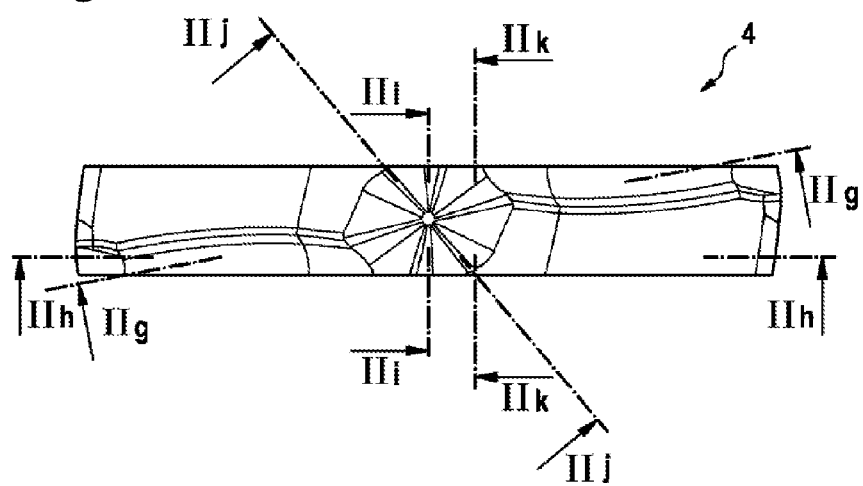

FIG. 2f shows a top view onto the insert 4 which corresponds to the representation in FIG. 2a. The cutting developments IIg-IIg, IIh-IIh, IIi-IIi, IIj-IIj and IIk-IIk for the sectional FIGS. 2g, 2h, 2i, 2j and 2k are shown in this top view.

Figure 2G:
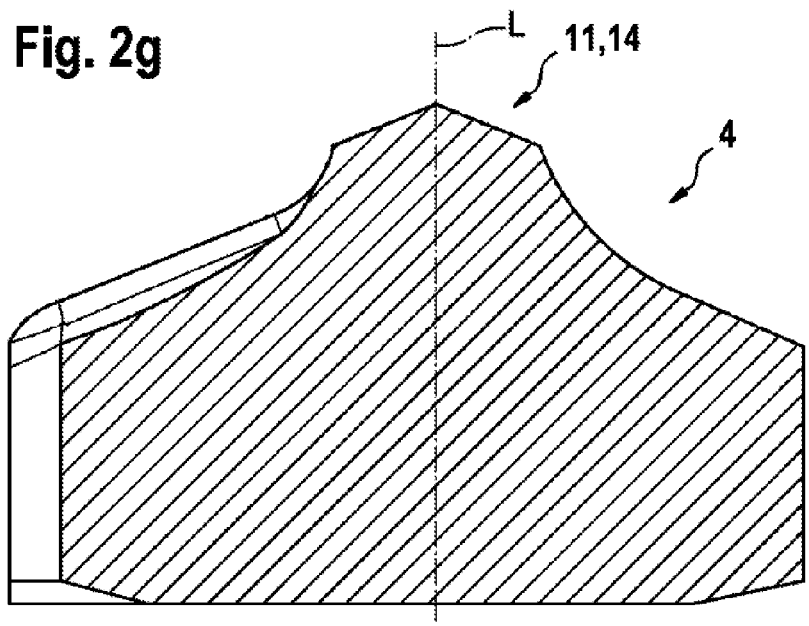
Figure 2H:
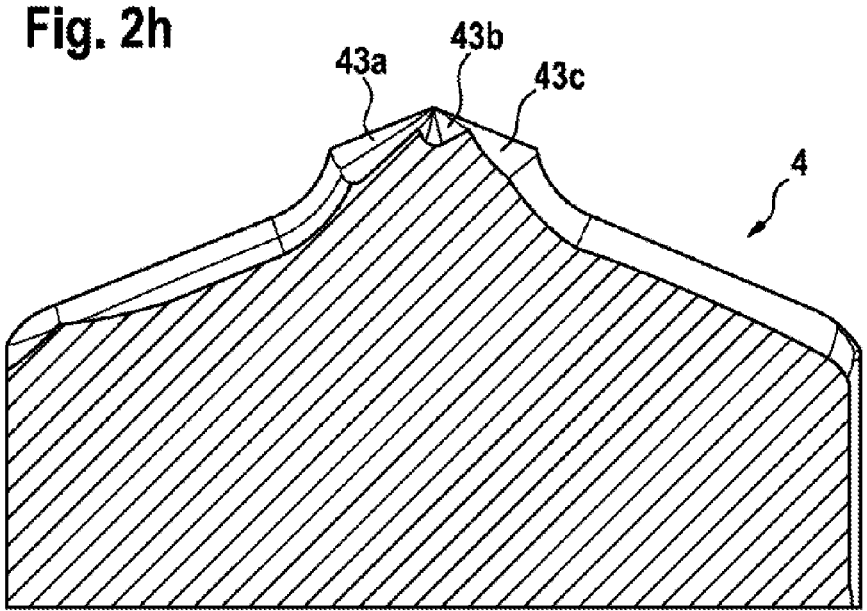
Figure 2I:
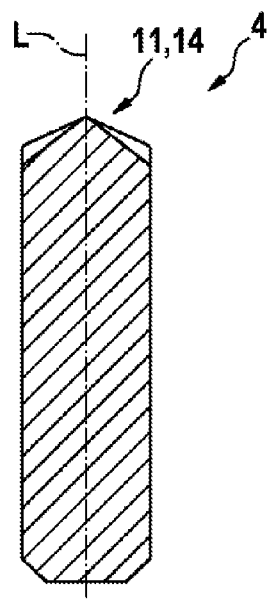
Figure 2J:
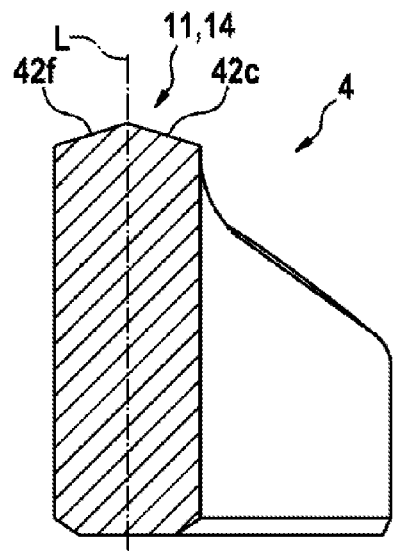
Figure 2K:
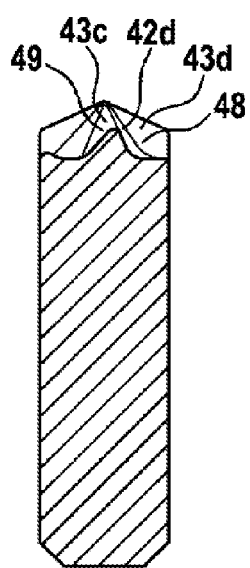
Figure 3A:
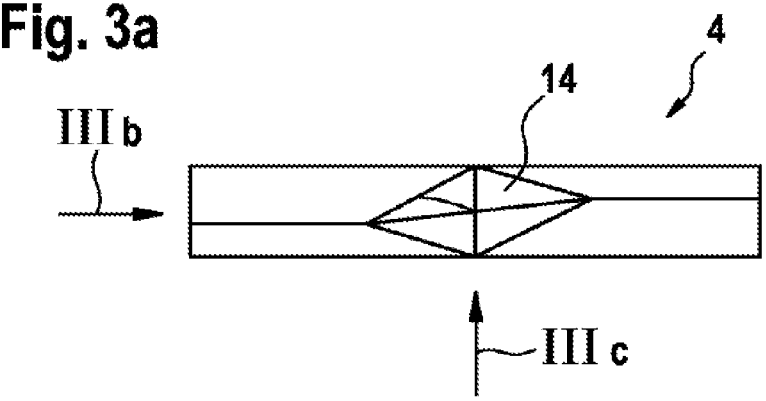
Figure 3B:
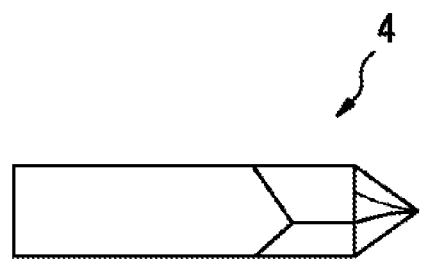
Figure 3C:
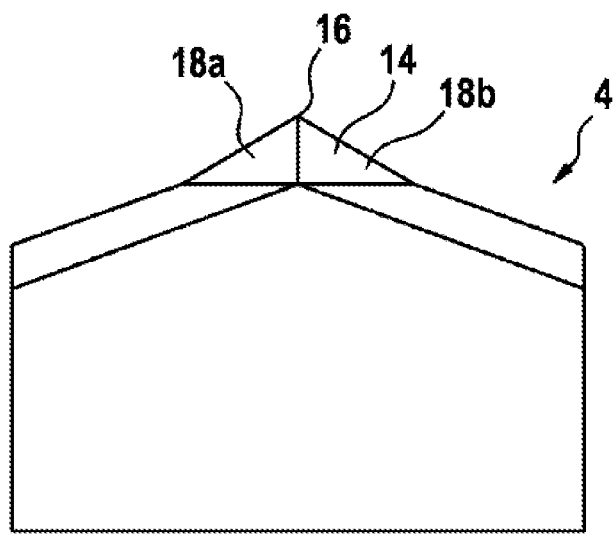
Figure 3D:
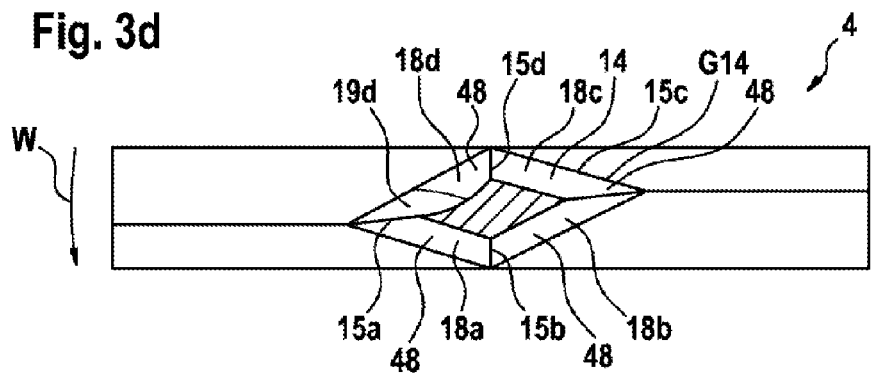
Figure 3E:
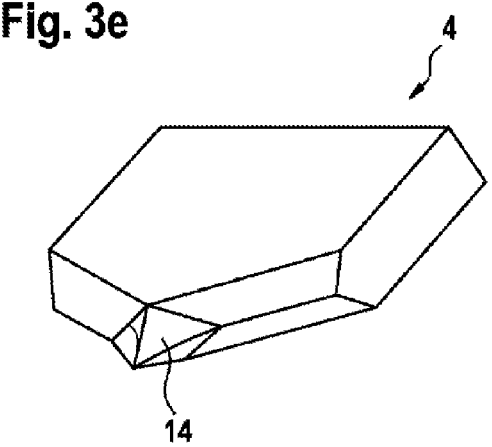
Figure 4A:
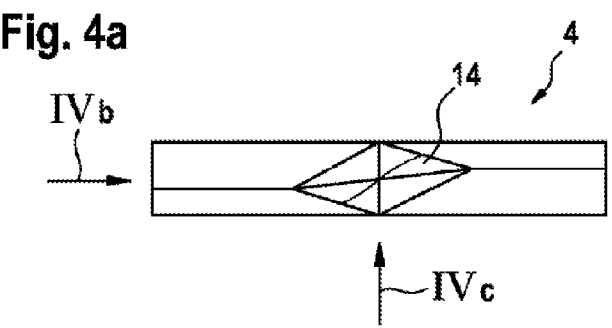
Figure 4B:
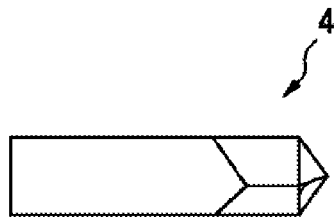
Figure 4C:
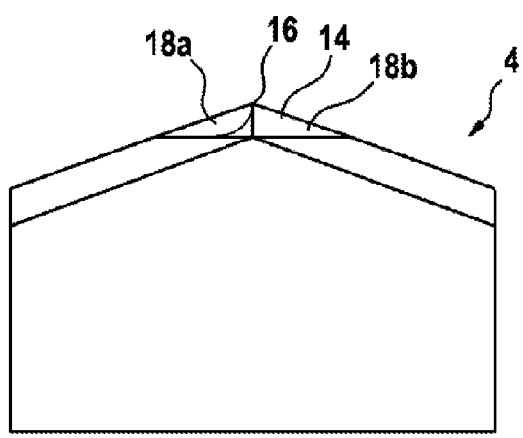
Figure 4D:
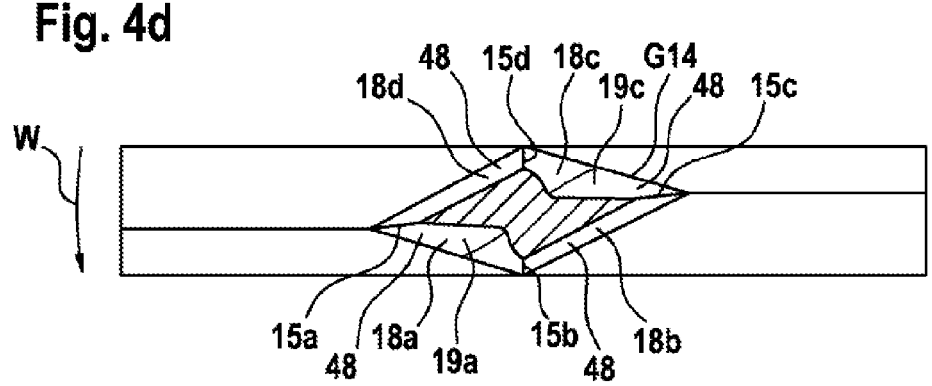
Figure 4E:
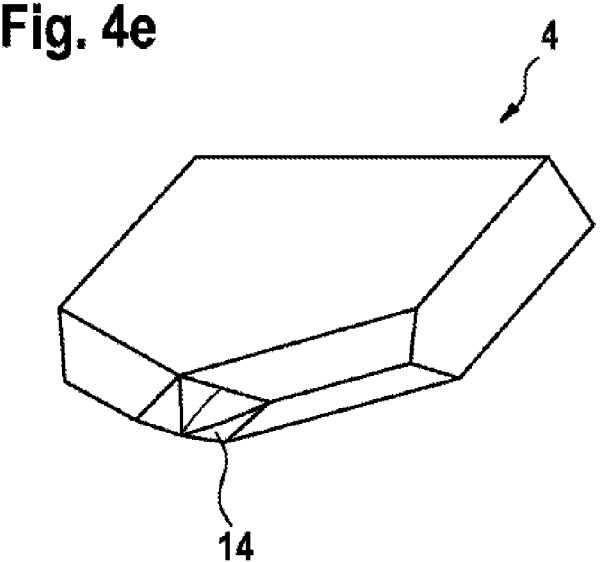
Figure 5A:
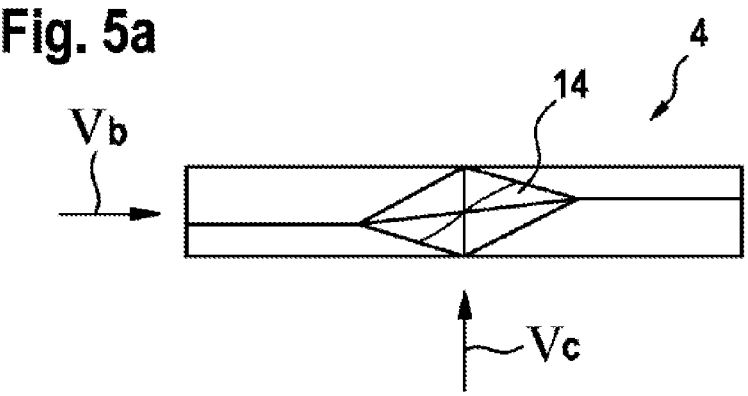
Figure 5B:
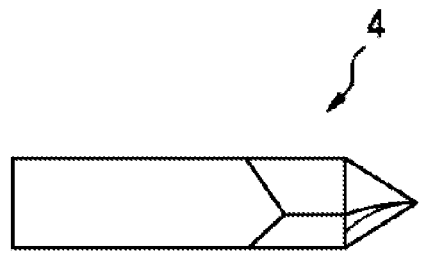
Figure 5C:
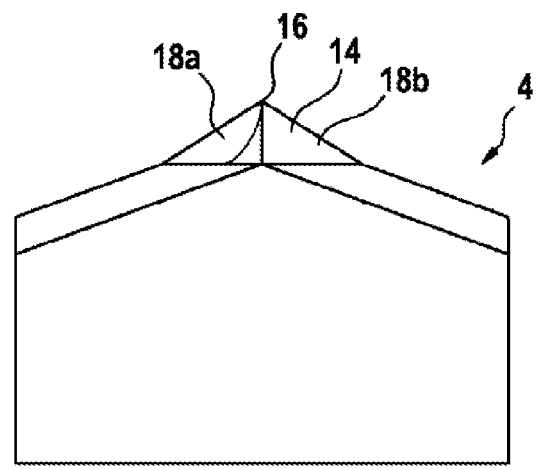
Figure 5D:
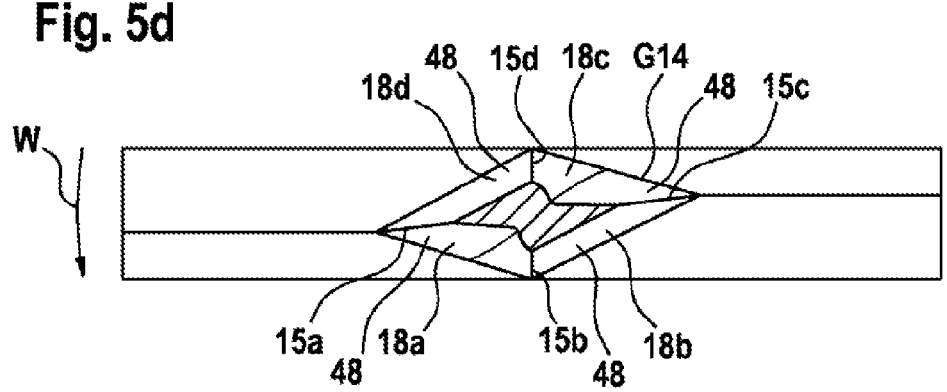
Figure 5E:
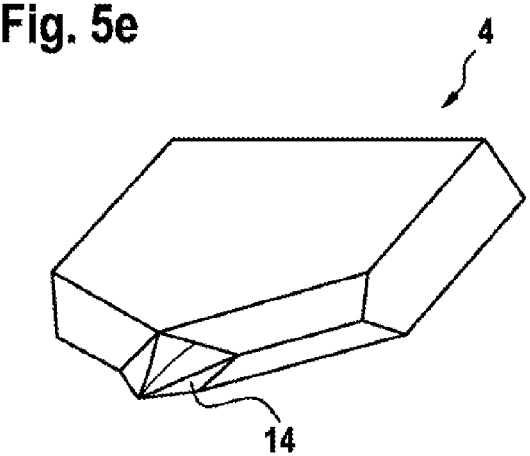
Figure 7B:
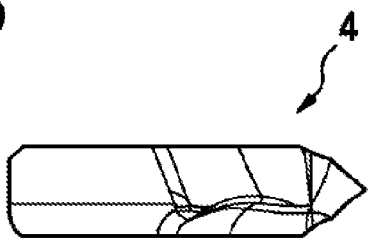
Figure 7C:
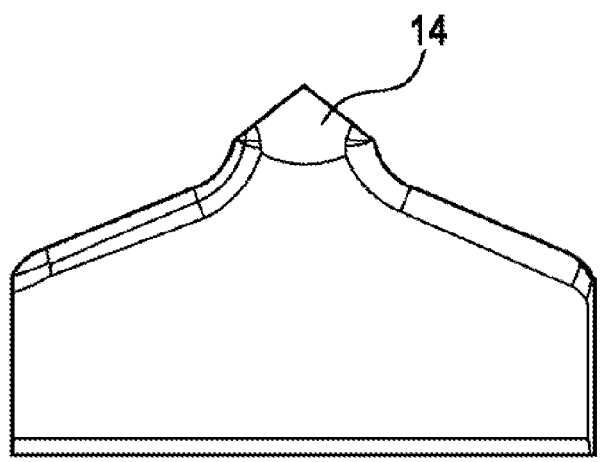
Figure 7D:
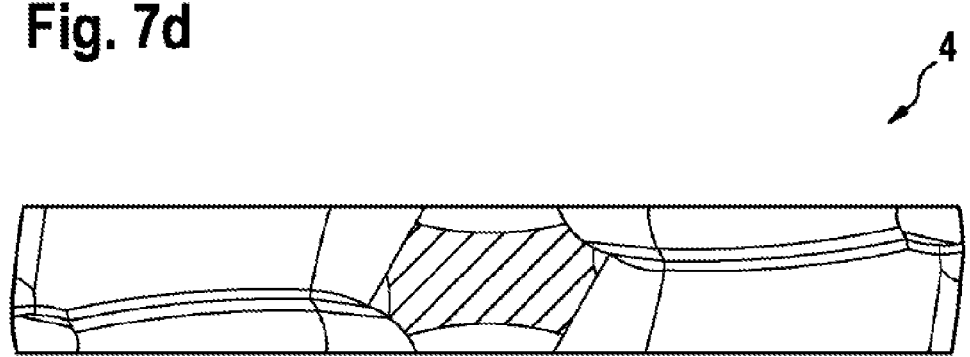
Figure 7E:
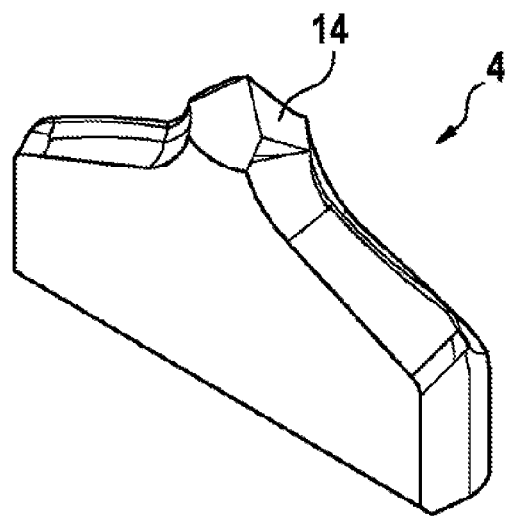
Figure 8A:
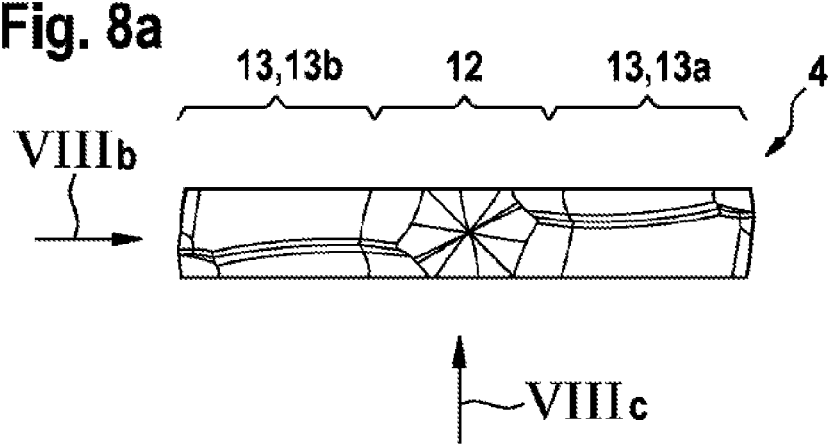
Figure 8B:
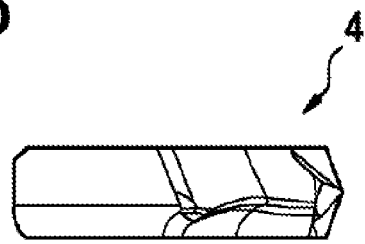
Figure 8C:
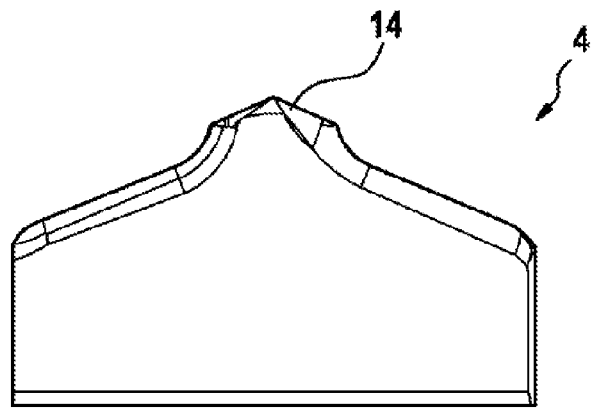
Figure 8D:
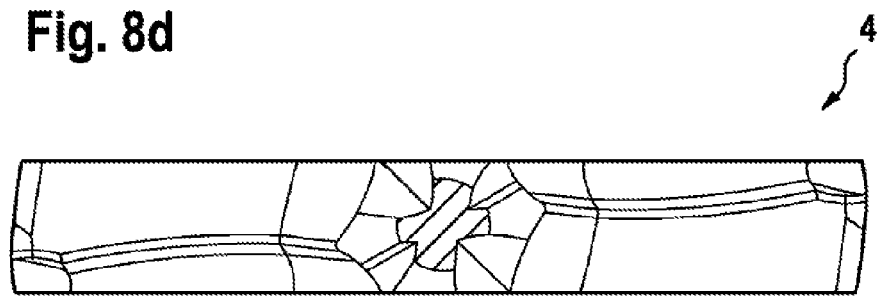
Figure 8E:
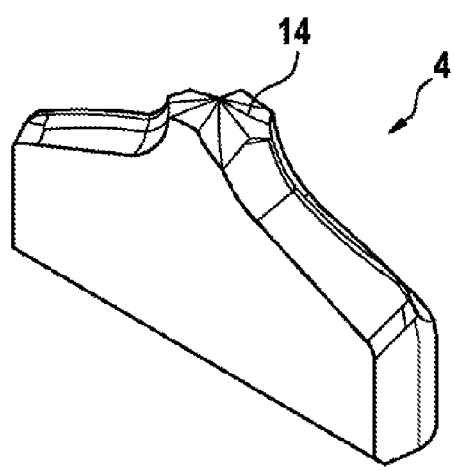
Figure 9A:
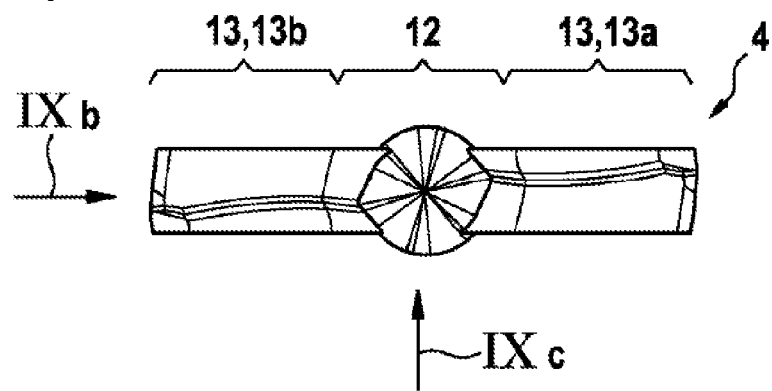
Figure 9B:
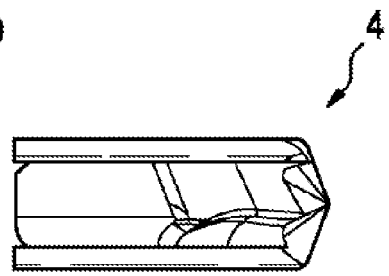
Figure 9C:
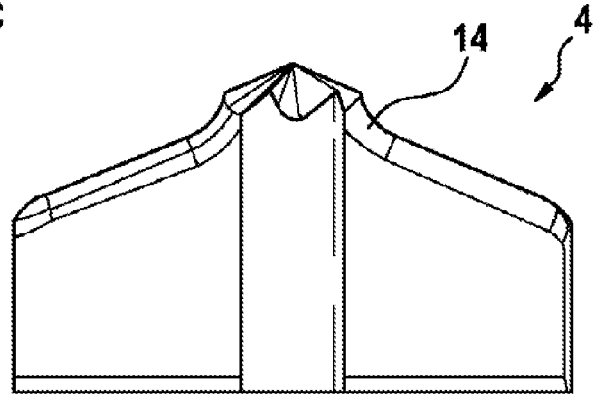
Figure 10B:
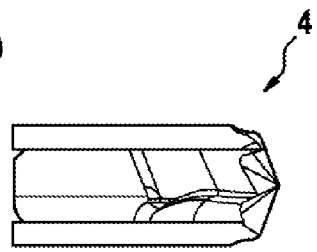
Figure 10C:
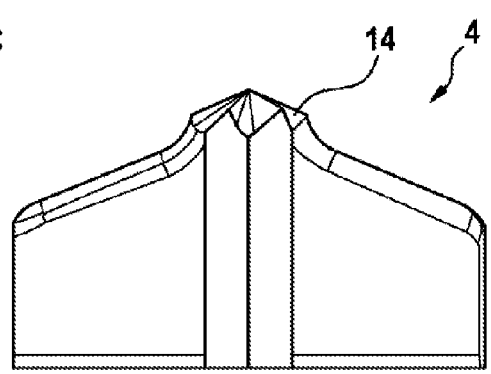
Figure 10D:
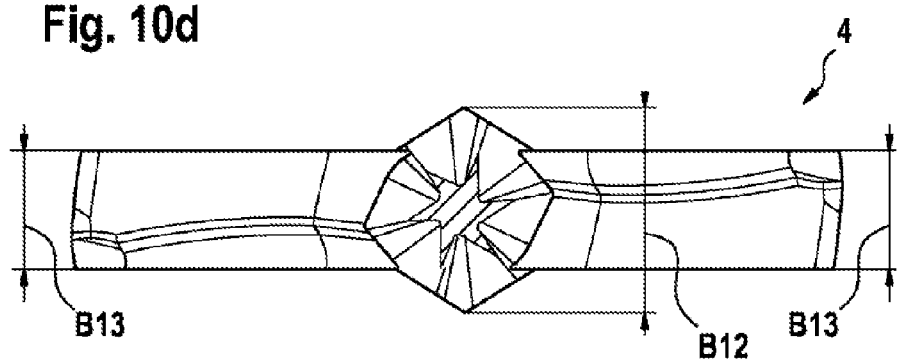
Figure 10E:
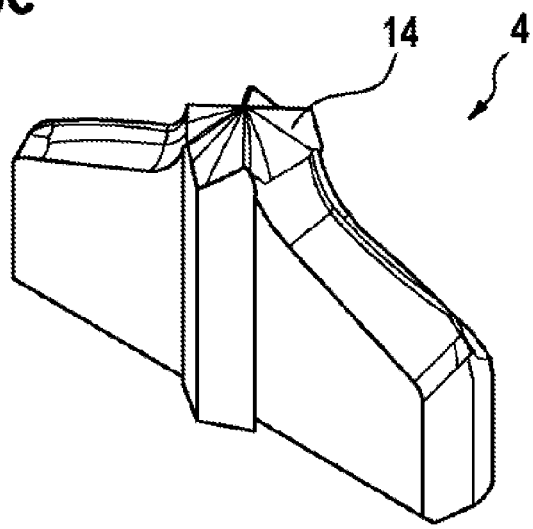

The symmetrical design of the centering tip 11 or of the pyramid 14 with respect to the longitudinal axis L can be seen in FIG. 2g. The cavities 43a, 43b and 43c with their concavely curved form can be seen in FIG. 2h. FIG. 2i shows, as FIG. 2g, the symmetrical development of the centering tip 11 or of the pyramid 14. FIG. 11 shows the symmetrical development of the pyramidal edges 42c and 42f with reference to the longitudinal axis L. Finally, FIG. 2k shows a section, from which it can be seen how the cavities 43c and 43d ascend toward the pyramidal edge 42d and form a flank 49 and a face 48.

Applicable to the eight further design variants of insert 4 for rock drilling tools shown in FIGS. 3a to 10e, is that the figure referenced by a in each case represents a top view onto the insert, the figures referenced by b and c in each case represent side views of the insert shown, the figure referenced by d in each case shows a top view of the insert with a sectioned tip and the figure referenced by e in each case shows a perspective view of the respective figure. In addition, applicable to all eight exemplary embodiments is that a centering tip 14 realized as a pyramid 14 is arranged in an inner region 12 and an outer region 13, which consists of two part regions 13a and 13b, connects to the inner region 12.

In the case of the inserts 4 shown in FIGS. 3a to 6e, the pyramids 14 each have a rectangular base surface G14 and, in a corresponding manner, four pyramidal edges 15a to 15d, which run to a tip 16 of the pyramid. The pyramidal edges 15a to 15d are connected by four side surfaces 18a to 18d.

In the case of the insert 4 shown in FIGS. 3a to 3e, the side surface 18d is realized as a cavity 19d. This means that the pyramidal edge 15d has integrally formed thereon an enhanced face 48, which has a negative rake angle which is smaller numerically than the further faces 48 formed by the planar side surfaces 18a, 18b and 18c.

In the case of the insert 4 shown in FIGS. 4a to 4e, the side surfaces 18a and 18c are realized as cavities 19a and 19c. This means that the pyramidal edges 15a and 15c have integrally formed thereon an enhanced face 48 which has a negative rake angle which is smaller numerically than the further faces 48 formed by the planar side surfaces 18b and 18d.

The description relating to FIGS. 4a to 4e relates to the insert 4 shown in FIGS. 5a to 5e, the centering tip 11 being integrated completely into the insert 4 in the design variants of FIGS. 4a to 4e and protruding in an effective direction W in the design variants of FIGS. 5a to 5e.

In the case of the insert 4 shown in FIGS. 6a to 6e, the side surfaces 18a to 18d are realized as a cavity 19a to 19d. This means that all the pyramidal edges 15a to 15d have integrally formed thereon an enhanced face 48, which has a negative rake angle which is numerically smaller than faces formed by planar side surfaces (not present here).

In the case of the insert 4 shown in FIGS. 7a to 7e, this is a design variant which is similar to the first design variant shown in FIG. 1a and following pages.

In the case of the insert 4 shown in FIGS. 8a to 8e, this is a design variant which is similar to the second design variant shown in FIG. 2a and following pages.

The design variants shown in FIGS. 9a to 9e and 10a to 10e differ from the previously described design variants in particular in that the cutting bodies 4 thereof in the inner region 12 have a width B12 which is greater than a width B13 of the outer region 13 of the cutting body 4.

Figure 11A:
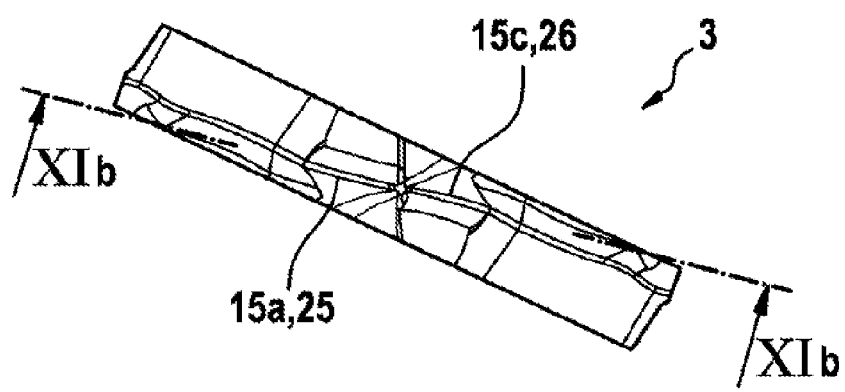
FIG. 11a to 11f: show further views and sections of the cutting body shown in FIGS. 1a to 1p and FIGS. 12 to 14: shows top views onto two further schematically represented rock drilling tools.
Figure 11B:
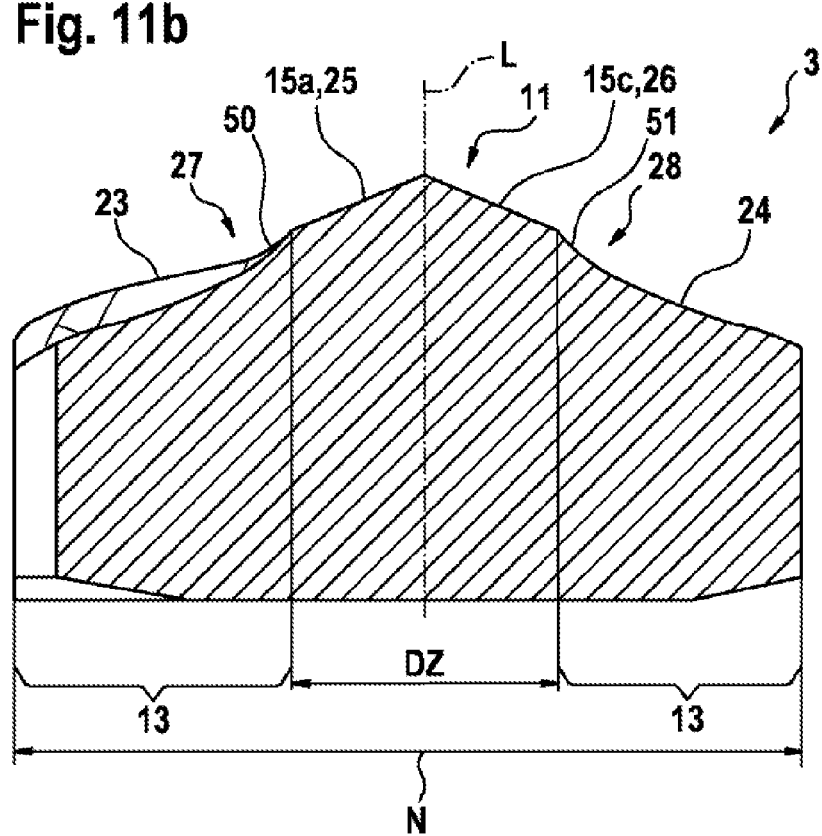
Figure 11C:
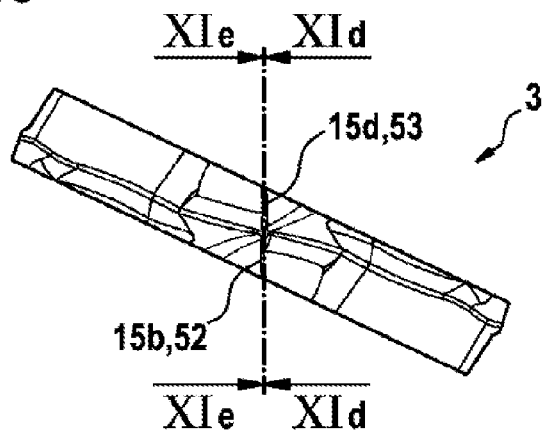
Figure 11D:
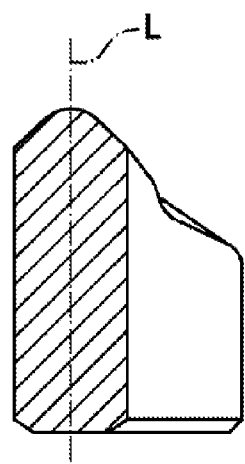
Figure 11E:
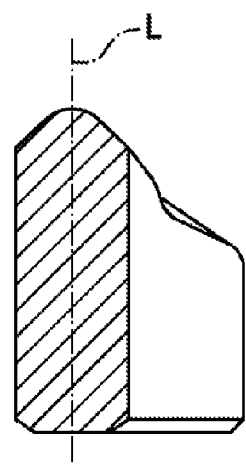
Figure 11F:
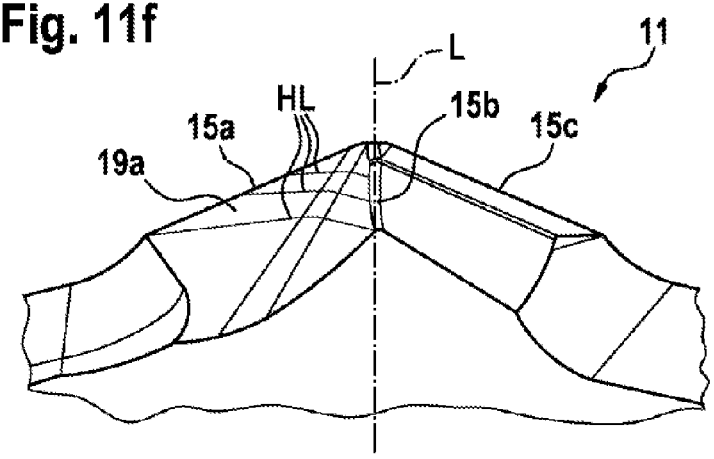

FIGS. 11a to 11f shows further views and sections of the cutting body 3 shown in FIGS. 1a to 1p. FIG. 11a shows a side view of the cutting body 3 in which the development of a section through the cutting body 3 shown in FIG. 11b is provided. The section XIb-XIb extends through the pyramidal edges 15a and 15c, which as inner cutting edges 25, 26 form a portion of the main cutting edges 27 and 28. It can be seen in the sectional view of FIG. 11b how the pyramidal edges 15a and 15c extend in a symmetrical manner with respect to the longitudinal axis L of the cutting body 3 and merge into the outer cutting edges 23, 24 of the outer region 13 by means of shoulders 50, 51. In addition, FIG. 11b shows the nominal diameter N of the insert 3 once again. A diameter DZ of the centering tip 11 is approximately between ⅙ and ⅜ of the nominal diameter N and in the exemplary embodiment shown is approximately ⅓ of the nominal diameter N. FIG. 11c shows two cutting developments which intersect the cutting body 3 along the pyramidal edges 15b and 15d, which form the secondary cutting edges 52, 53. Said pyramidal edges 15b and 15d are also realized in a symmetrical manner with respect to the longitudinal axis L. Finally, FIG. 11f shows a view of the detail of the centering tip 11. In this case, to clarify the geometrical form of the centering tip 11 contour lines HL are indicated for the cavity 19a, said contour lines circling the centering tip 11 at a constant depth, depths being measured in the direction of the development of the longitudinal axis L.

Figure 12:
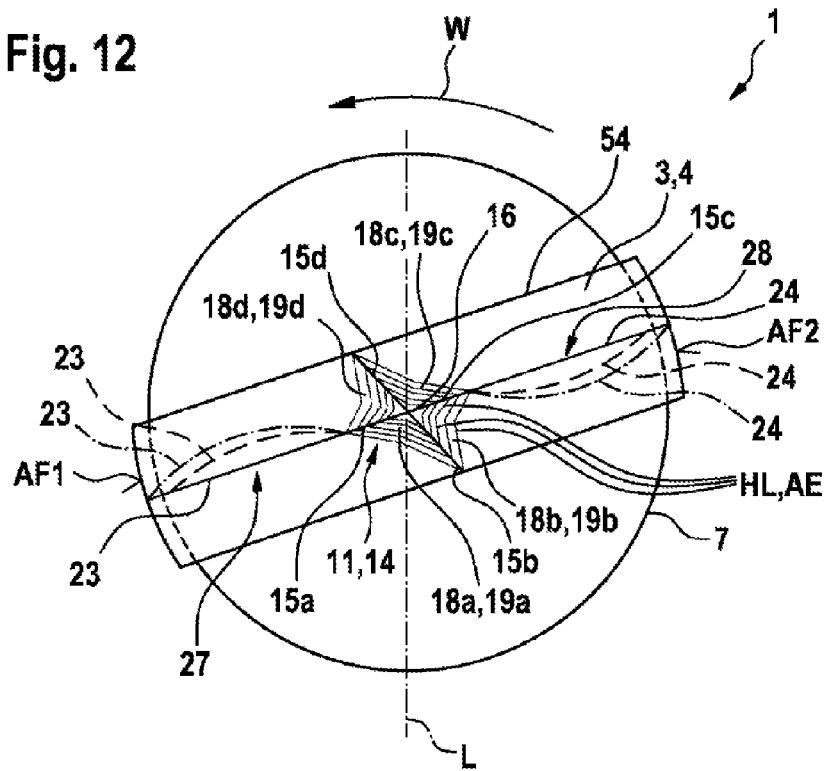
Figure 13:
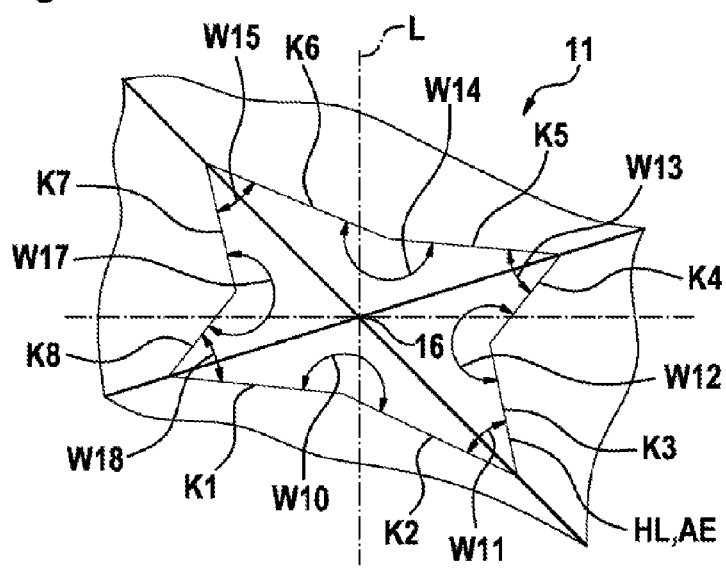

FIG. 12 shows a schematic representation of a top view onto a design variant of a rock drilling tool 1 as claimed in the disclosure. The rock drilling tool 1 includes a cutting body 3 which is realized as an insert 4 and is inserted into a slot 54 which is realized in a helix 7 of the rock drilling tool 1. The cutting body 3 has a centering tip 11 with a pyramid 14 with four pyramidal edges 15a to 15d. In this case, the pyramidal edges 15a and 15c are components of two main cutting edges 27, 28, which extend from a tip 16 radially outward over the cutting body 3. Side surfaces 18a to 18d, which extend between the pyramidal edges 15a to 15d, are realized as cavities 19a to 19d. The topography of the centering tip 11 is made clear by means of several contour lines HL. When viewed in the direction of a longitudinal axis L of the rock drilling tool 1 which is perpendicular to the drawing plane, all the contour lines HL of the centering tip 11 form in each case octagons AE, the adjacent edges K1 to K8 of which enclose with one another in an alternating manner inner angles W10, W13, W15 and W17 which are more than 180° and angles W12, W14, W16 and W18 which are less than 180°. For better perceptibility, the centering tip 11 is shown in an enlarged manner in FIG. 13 with a contour line HL. Three variants are shown in FIG. 12 for the development of outer cutting edges 23 and 24. Continuous lines show a radial development of the cutting edges 23 and 24. A broken line shows a development of the cutting edges 23 and 24 where the cutting edges 23 and 24 have a curved development and, when viewed in the direction of the longitudinal axis, are curved in opposition to a direction of rotation w of the rock drilling tool 1, the cutting edges 23 and 24 again having a radial development toward the outer surfaces of the AF1 and AF2 of the cutting body 3. Dot-dash lines indicate the development of the cutting edges 23 and 24 in a third design variant where the cutting edges 23 and 24 extend in a curved manner from the pyramid 14 as far as up to the outer surfaces AF1 and AF2 and are curved in opposition to the direction of rotation w of the rock drilling tool 1.

FIG. 14 shows a schematic representation of a top view onto a further design variant as claimed in the disclosure of a rock drilling tool 1 with a cutting body 3. Regarding the design of the centering tip 11 and the development of the outer cutting edges 23 and 24, reference is made to the description relating to FIGS. 12 and 13. The cutting body 3 is defined between outer surfaces AF1 and AF2 by side surfaces 55, 56, the first side surface 55 merging into a face 23a of the first cutting edge 23 and a flank 24b of the second cutting edge 24 and the second side surface 56 merging into a flank 23b of the first cutting edge 23 and a face 24a of the second cutting edge 24 and the side surfaces 55, 56 in the region of the first cutting edge 23 and in the region of the second cutting edge 24, when viewed in the direction of the longitudinal axis L of the rock drilling tool 1, which is perpendicular to the drawing plane, have a diverging development radially outward with respect to each other. Part surfaces 55a and 56b of the side surfaces 55 and 56, which merge into the flank 23a and the face 23b of the first cutting edge 23, enclose an angle W23, which is between 10° and 40°. Part surfaces 56a and 55b of the side surfaces 55 and 56, which merge into the flank 24a and the face 24b of the second cutting edge 24, enclose an angle W24, which is between 10° and 40°.

The invention claimed is:

1. A rock drilling tool for rotational percussive machining of concrete, rock, masonry, and such materials, comprising:
a drill head which includes a cutting body, and
a helix arranged between the drill head and a shaft,
wherein the cutting body extends in an uninterrupted manner over a nominal diameter of the rock drilling tool,
wherein the cutting body includes an inner region configured as a centering tip and an outer region adjoining the centering tip in the radial direction,
wherein the outer region is set back in the effective direction of the rock drilling tool in relation to the centering tip,
wherein the centering tip is configured as a pyramid or as a truncated pyramid and has pyramidal edges,
wherein side surfaces lie between the pyramidal edges,
wherein a longitudinal center axis of the drilling tool passes through a tip of the pyramid or of the truncated pyramid,
wherein at least one side surface of the centering tip is configured as a cavity, and
wherein a cavity lying in front of the pyramidal edge in the direction of rotation of the rock drilling tool is configured as a face cavity, wherein a cavity lying behind the pyramidal edge in the direction of rotation of the rock drilling tool is configured as a flank cavity, and wherein the face cavity has an ascension that is different than an ascension of the flank cavity.

2. The rock drilling tool as claimed in claim 1, wherein at least two adjacent side surfaces of the centering tip are configured as a cavity.

3. The rock drilling tool as claimed in claim 2, wherein:
a first wedge is formed in the region of the pyramidal edge of the centering tip lying between two cavities, the first wedge having wedge surfaces formed by surface portions of the adjacent cavities,
a second wedge is formed in the region of the pyramidal edge of the centering tip lying between two planar surfaces, the second wedge having wedge surfaces formed by surface portions of the adjacent planar surfaces, and
a first wedge angle of the first wedge is smaller than a second wedge angle of the second wedge.

4. The rock drilling tool as claimed in claim 1, wherein all of the side surfaces of the centering tip are configured as a cavity.

5. The rock drilling tool as claimed in claim 1, wherein the face cavity ascends more steeply toward the pyramidal edge than the flank cavity.

6. The rock drilling tool as claimed in claim 1, wherein the cutting body is configured as an insert which extends over the nominal diameter of the rock drilling tool or as a solid carbide head which extends over the nominal diameter of the rock drilling tool.

7. The rock drilling tool as claimed in claim 1, wherein a base of the pyramid is configured as a polygon with an even number of corners or as a polygon with an odd number of corners.

8. The rock drilling tool as claimed in claim 1, wherein at least one of the cavities deepens in the direction of a center of gravity of the centering tip.

9. The rock drilling tool as claimed in claim 1, wherein at least two of the pyramidal edges are configured as inner cutting edges and are formed as an uninterrupted continuation of the outer cutting edges of the cutting body.

10. The rock drilling tool as claimed in claim 1, wherein at least one of the pyramidal edges extends between its root and the tip of the pyramid or of the truncated pyramid in at least one portion with increasing gradient with respect to the longitudinal axis or with reducing gradient with respect to the longitudinal axis or with erratic change in the gradient with respect to the longitudinal axis.

11. The rock drilling tool as claimed in claim 9, wherein outer cutting edges are formed outside the centering tip by the coinciding of a face and a flank, the outer cutting edges having a curved development and being curved in opposition to a direction of rotation of the drilling tool when viewed in the direction of the longitudinal axis.

12. The rock drilling tool as claimed in claim 1, wherein the cutting body is defined by outer surfaces, wherein a first outer surface merges into a face of a first cutting edge and a flank of a second cutting edge, wherein a second outer surface merges into a flank of the first cutting edge and a face of the second cutting edge, and wherein, when viewed in the longitudinal direction, the outer surfaces have a diverging development radially outward in the region of the first cutting edge and in the region of the second cutting edge.

13. The rock drilling tool as claimed in claim 1, wherein at least one contour line of the centering tip specifies a contour in the direction of the longitudinal axis the at least one contour line forms an octagon having inner angles enclosed between consecutive side edges that are, in an alternating manner, more than 180° and less than 180°.

14. The rock drilling tool as claimed in claim 1, wherein the centering tip has a diameter which is proportionally dependent on the nominal diameter of the rock drilling tool or of the insert.

15. The rock drilling tool as claimed in claim 1, wherein at least one cavity lies between two adjacent or neighboring pyramidal edges.

16. The rock drilling tool as claimed in claim 1, wherein at least one cavity lies in the direction of rotation of the rock drilling tool in front and/or behind of the pyramidal edges.

17. The rock drilling tool as claimed in claim 1, wherein at least one cavity is configured as a concave surface that runs between two pyramidal edges of the centering tip.

18. A rock drilling tool for rotational percussive machining of concrete, rock, masonry, and such materials, comprising:
   a drill head which includes a cutting body, and
   a helix arranged between the drill head and a shaft,
   wherein the cutting body extends in an uninterrupted manner over a nominal diameter of the rock drilling tool,
   wherein the cutting body includes an inner region configured as a centering tip and an outer region adjoining the centering tip in the radial direction,
   wherein the outer region is set back in the effective direction of the rock drilling tool in relation to the centering tip,
   wherein the centering tip is configured as a pyramid or as a truncated pyramid and has pyramidal edges,
   wherein side surfaces lie between the pyramidal edges,
   wherein a longitudinal center axis of the drilling tool passes through a tip of the pyramid or of the truncated pyramid,
   wherein at least one side surface of the centering tip is configured as a cavity, and
   wherein at least one of the pyramidal edges extends between its root and the tip of the pyramid or of the truncated pyramid in one or more of a curved manner and a buckled manner along at least one portion keeping the gradient constant with respect to the longitudinal axis.

19. A rock drilling tool for rotational percussive machining of concrete, rock, masonry, and such materials, comprising:
   a drill head which includes a cutting body, and
   a helix arranged between the drill head and a shaft,
   wherein the cutting body extends in an uninterrupted manner over a nominal diameter of the rock drilling tool,
   wherein the cutting body includes an inner region configured as a centering tip and an outer region adjoining the centering tip in the radial direction,
   wherein the outer region is set back in the effective direction of the rock drilling tool in relation to the centering tip,
   wherein the centering tip is configured as a pyramid or as a truncated pyramid and has pyramidal edges,
   wherein side surfaces lie between the pyramidal edges,
   wherein a longitudinal center axis of the drilling tool passes through a tip of the pyramid or of the truncated pyramid,
   wherein at least one side surface of the centering tip is configured as a cavity,
   wherein the centering tip has a diameter which is proportionally dependent on the nominal diameter of the rock drilling tool or of the insert,
   wherein a base of the pyramid is configured as a tetragon, a hexagon, or a pentagon, and
   wherein the diameter of the centering tip is between $1/6$ and $3/6$ of the nominal diameter of the rock drilling tool.

* * * * *